United States Patent
Andersen et al.

(10) Patent No.: US 11,732,059 B2
(45) Date of Patent: Aug. 22, 2023

(54) SPHINGAN OLIGOSACCHARIDES

(71) Applicant: CP KELCO U.S., INC., Atlanta, GA (US)

(72) Inventors: Bastian Borum Andersen, Frederiksberg (DK); Justin Bradford Thompson, Shepherdsville, KY (US); Jan Larsen, Valby (DK); Sune Allan Petersen, Greve (DK); Lan Ma, Chula Vista, CA (US); Willis C. Baldwin, Jr., San Diego, CA (US); JeRay Jay Rosas, San Diego, CA (US); Andrew John Ryder, Jamul, CA (US)

(73) Assignee: CP Kelco U.S., Inc., Atlanta, GA (US)

( * ) Notice: Subject to any disclaimer, the term of this patent is extended or adjusted under 35 U.S.C. 154(b) by 96 days.

(21) Appl. No.: 17/376,219

(22) Filed: Jul. 15, 2021

(65) Prior Publication Data
US 2022/0017649 A1 Jan. 20, 2022

Related U.S. Application Data

(60) Provisional application No. 63/053,193, filed on Jul. 17, 2020.

(51) Int. Cl.
*C08B 37/00* (2006.01)
*A23L 33/125* (2016.01)

(52) U.S. Cl.
CPC .......... *C08B 37/006* (2013.01); *A23L 33/125* (2016.08)

(58) Field of Classification Search
None
See application file for complete search history.

(56) References Cited

U.S. PATENT DOCUMENTS

| | | |
|---|---|---|
| 3,275,687 A | 9/1966 | Lieb et al. |
| 5,332,809 A | 7/1994 | Della Valle et al. |
| 6,242,035 B1 | 6/2001 | Clark |
| 8,231,921 B2 | 7/2012 | Bezanson et al. |
| 9,284,615 B2 | 3/2016 | Torres et al. |
| 2016/0295887 A1 | 10/2016 | Morrison |
| 2020/0230167 A1 | 7/2020 | Morrison |

OTHER PUBLICATIONS

Bielecka et al., Selection of probiotics and prebiotics for synbiotics and confirmation of their in vivo effectiveness, Food Research International (2002) 35(2-3): 125-131 ("Bielecka 2002").
Online collection of ion exchange resins collected by François de Dardel, dardel.info/IX/AllResins.php?sort=4&filtre=2, last accessed on Jun. 22, 2021 ("Dardel").
Gupta et al., Solid Acids: Green alternatives for acid catalysis, Catalysis Today (2014) 236(Part B): 153-170 ("Gupta 2014").
Liu et al., Hydrophobic Solid Acids and Their Catalytic Applications in Green and Sustainable Chemistry, ACS Catal. (2018) 8(1): 372-391 ("Liu 2018").
Okuhara, T Water-Tolerant Solid Acid Catalysts, Chem. Rev. 2002, 102(10): 3641-3666 ("Okuhara 2002").
Steer et al., Perspectives on the role of the human gut microbiota and its modulation by pro- and prebiotics, Nutrit. Res. Revs. (2000) 13(2): 229-254 ("Steer 2000").
Suganuma et al., Hydrolysis of Cellulose by Amorphous Carbon Bearing SO3H, COOH, and OH Groups, J. Am. Chem. Soc. 2008, 130(38): 12787-12793 ("Suganuma 2008").
Vogel's Textbook of Practical Organic Chemistry (1989), Section 2.19 Filtration Techniques, pp. 133-135 ("Vogel's").
Zoetendal et al., Temperature Gradient Gel Electrophoresis Analysis of 16S rRNA from Human Fecal Samples Reveals Stable and Host-Specific Communities of Active Bacteria, App. Environ. Microbiol. (1998) 64(10): 3854-3859 ("Zoetendal 1998").
Lewatit® S 1568 Product Information, 2020.
Purolite® A300 Product Data Sheet, 2020.
International Search Report & Written Opinion Issued in PCT Patent Application No. PCT/US2021/041984 dated Oct. 25, 2021; 18 Pages.
Hashimoto, "Microbial System for Polysaccharide Depolymerization: Enzymatic Route for Gellan Depolymerization by *Bacillus* Sp. GL1", Archives of Biochemistry and Biophysics, Academic Press, US, vol. 339, No. 1, Mar. 1, 1997 (Mar. 1, 1997); 9 pp. 17-23.
Hashimoto, et al.: "Molecular identification of an α-l-rhamnosidase from *Bacillus* sp. strain GL1 as an enzyme involved in complete metabolism of gellan", Archives of Biochemistry and Biophysics, Academic Press, US, vol. 415, No. 2, Jul. 15, 2003; 10 pages.
Barbel Hahn-Hagerdal et al.: "The utilization of solid superacids for hydrolysis of glycosidic bonds in di-and polysaccharides: A model study on cellobiose, sucrose, and starch", Applied Microbiology and Biotechnology, Springer, Berlin, DE, vol. 17, No. 6, Nov. 1, 1983; 6 pages.

*Primary Examiner* — Layla D Berry
(74) *Attorney, Agent, or Firm* — Merchant & Gould P.C.; Daniel R. Evans

(57) ABSTRACT

Disclosed herein is a sphingan oligosaccharide composition, its uses, and a process for preparing the same.

20 Claims, 6 Drawing Sheets

SPHINGAN OLIGOSACCHARIDES

RELATED APPLICATION

The present application claims priority to U.S. Provisional Patent Application No. 63/053,193, filed on Jul. 17, 2020.

FIELD OF THE INVENTION

Disclosed herein is a sphingan oligosaccharide composition, its uses, and a process for preparing the same.

BACKGROUND

The human gastrointestinal tract is a highly complex microbial ecosystem which has been shown to be remarkably stable. Zoetendal 1998. Many different approaches have been used to modulate the gut flora in a way that is beneficial to host health. See, e.g., Bielecka 2002 and Steer 2000. These different approaches include the addition of living microorganisms (probiotics) to food, the addition of food ingredients or dietary fiber (prebiotics) to stimulate selectively beneficial bacteria within the host, and a combination of both probiotics and prebiotics (synbiotics).

Recent studies showed that sphingans, sphingan polysaccharides, and sphingan oligosaccharides exhibit prebiotic activity. Morrison 2020. As explained therein, known sphingans include, for example, gellan (S-60), welan (S-130), rhamsan (S-194), and diutan (S-657). Morrison 2020 describes a process for preparing a sphingan oligosaccharide by hydrolyzing overnight a sphingan or sphingan polysaccharide with formic acid (at pH 2 and 95° C.) and filtering the hydrolysate using an ultrafiltration membrane having a molecular weight cut-off of either 5 kDa or 10 kDa. To develop a method to prepare a sphingan oligosaccharide with a stronger acid, e.g., sulfuric acid, it was determined that reaction times could be reduced. However, use of an acid to obtain a sphingan oligosaccharide requires subsequent separation of salts (e.g., sodium formate, sodium sulfate, potassium sulfate, etc.), typically using ion exchange resins, which results in processing challenges. For instance, ion exchange treatment may cause large pH variations, which may result in sample discoloration and unacceptable off-taste (e.g., Maillard reaction) and unwanted product properties.

Separating unwanted salts from the formed sphingan oligosaccharide composition is of paramount interest for an ingestible composition comprising a sphingan oligosaccharide at least because the U.S. Food and Drug Administration ("FDA") specifies limits on the amount of certain salt forms. For instance, the FDA specifies that the amount of potassium sulfate should not exceed 0.015% in a nonalcoholic beverage. Further, the FDA specifies limits for other forms of sulfate in baked goods, confections, and the like. Certain sulfate salt forms (e.g., sodium sulfate, magnesium sulfate, and potassium sulfate) are known active ingredients in certain colon cleansing products. See, e.g., SUPREP® BOWEL PREP KIT. Accordingly, a high sulfate salt content may result in undesirable side effects for one that ingests a sulfate-containing sphingan oligosaccharide. Other acid salts (e.g., sodium chloride (from hydrochloric acid), sodium nitrate (from nitric acid), and sodium formate (from formic acid)) may result in an undesirable taste for the consumer. The processes described herein provide for a sphingan oligosaccharide composition having a reduced, residual salt content.

SUMMARY

Disclosed herein is a sphingan oligosaccharide composition, its uses, and a process for preparing the same.

DETAILED DESCRIPTION

Figure 1:
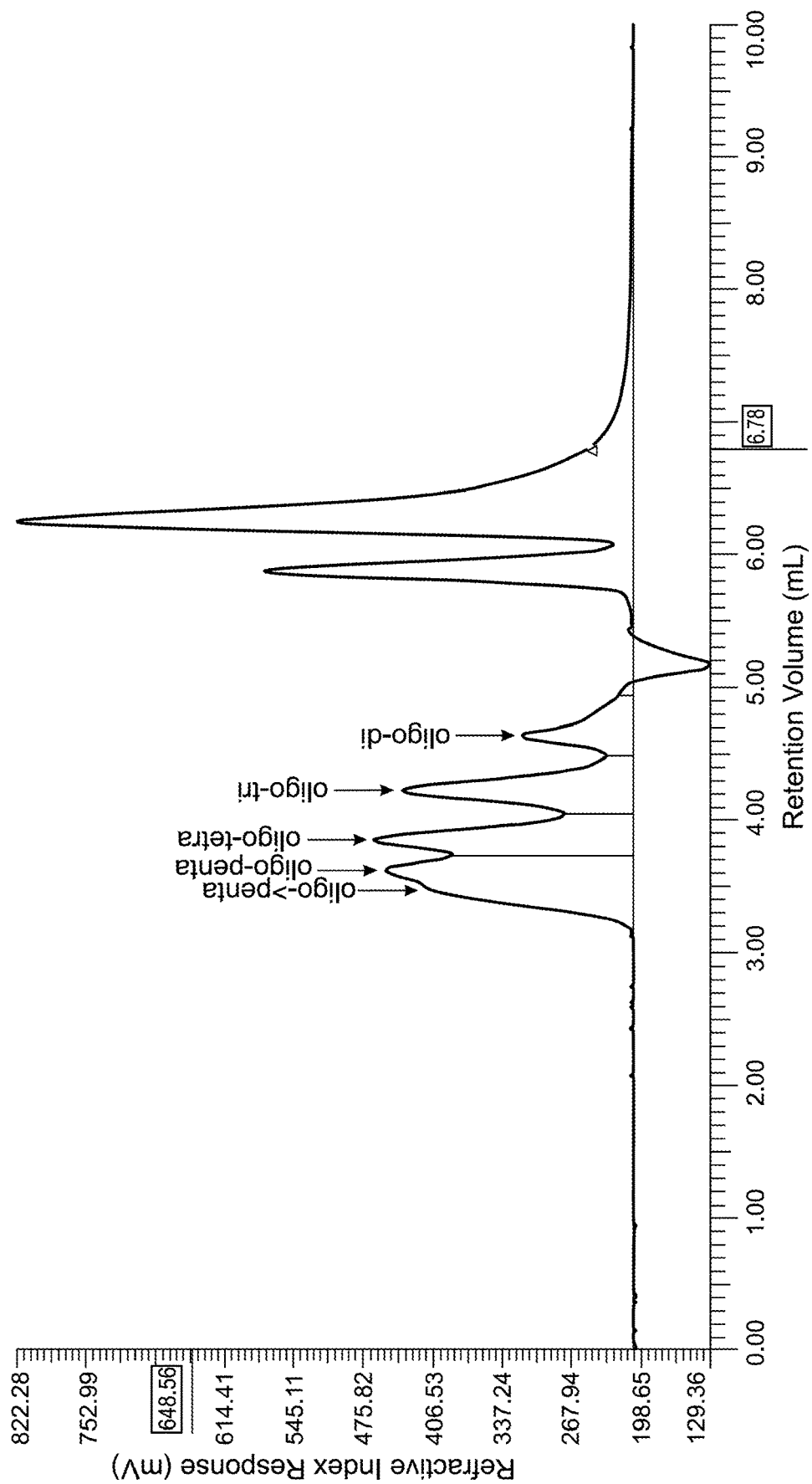
FIG. 1 includes a FIPA chromatogram of a representative oligosaccharide sample.

Embodiments disclosed herein relate to a process for preparing a sphingan oligosaccharide, the sphingan oligosaccharide made therefrom, an ingestible composition, and a use of the sphingan oligosaccharide for promoting beneficial bacterial growth in the colon of a mammal.

A embodiment is directed to a process for preparing a sphingan oligosaccharide composition, comprising: (a) providing a sphingan composition comprising a sphingan and a liquid medium comprising a water; (b) contacting the sphingan composition with an effective amount of a solid acid to obtain an exchanged solid acid and an acidified sphingan composition; (c1) separating the acidified sphingan composition from the exchanged solid acid and hydrolyzing the acidified sphingan composition in the absence of the exchanged solid acid to obtain a sphingan hydrolysate composition; or (c2) hydrolyzing the acidified sphingan composition in the presence of the exchanged solid acid to obtain a sphingan hydrolysate composition and separating the exchanged solid acid from the sphingan hydrolysate composition; (d) adding a base to the sphingan hydrolysate composition to obtain the sphingan oligosaccharide composition having a pH of about 4 to about 8; and (e) optionally, contacting the sphingan composition and/or the sphingan oligosaccharide composition with a solid base.

The process may occur batch-wise, semi-continuously, continuously, or a combination thereof. For instance, in a continuous process, for example, a system flow rate may be determined by composition, viscosity, reaction rates, desired products, amount of solid acid, bed volume, etc.

It may be desirable to separate the exchanged solid acid from the acidified sphingan composition, e.g., when the desired hydrolyzing temperature exceeds the decomposition temperature of the solid acid/exchanged solid acid. Accordingly, one aspect relates to a process for preparing a sphingan oligosaccharide composition, comprising: (a) providing a sphingan composition comprising a sphingan and a liquid medium comprising a water; (b) contacting the sphingan composition with an effective amount of a solid acid to obtain an exchanged solid acid and an acidified sphingan composition; (c1) separating the acidified sphingan composition from the exchanged solid acid and hydrolyzing the acidified sphingan composition in the absence of the exchanged solid acid to obtain a sphingan hydrolysate composition; (d) adding a base to the sphingan hydrolysate composition to obtain the sphingan oligosaccharide composition having a pH of about 4 to about 8; and (e) optionally, contacting the sphingan composition and/or the sphingan oligosaccharide composition with a solid base.

Alternatively, the desired hydrolyzing temperature may not exceed the decomposition temperature of the solid acid/exchanged solid acid. Accordingly, another aspect relates to a process for preparing a sphingan oligosaccharide composition, comprising: (a) providing a sphingan composition comprising a sphingan and a liquid medium comprising a water; (b) contacting the sphingan composition with an effective amount of a solid acid to obtain an exchanged solid acid and an acidified sphingan composition; (c2) hydrolyzing the acidified sphingan composition in the presence of the exchanged solid acid to obtain a sphingan hydrolysate composition and separating the exchanged solid acid from the sphingan hydrolysate composition; (d) adding a base to the sphingan hydrolysate composition to obtain the sphingan oligosaccharide composition having a pH of about 4 to about 8; and (e) optionally, contacting the sphingan composition and/or the sphingan oligosaccharide composition with a solid base.

In one aspect, the sphingan is present in an amount of from about 0.1% w/w to about 15% w/w based on the sphingan composition, and all values in between, such as about 0.2% w/w, about 0.3% w/w, about 0.4% w/w, about 0.5% w/w, about 0.6% w/w, about 0.7% w/w, about 0.8% w/w, about 0.9% w/w, about 1.0% w/w about 1.1% w/w, about 1.2% w/w, about 1.3% w/w, about 1.4% w/w, about 1.5% w/w, about 1.6% w/w, about 1.7% w/w, about 1.8% w/w, about 1.9% w/w, about 2.0% w/w about 2.1% w/w, about 2.2% w/w, about 2.3% w/w, about 2.4% w/w, about 2.5% w/w, about 2.6% w/w, about 2.7% w/w, about 2.8% w/w, about 2.9% w/w, about 3.0% w/w about 3.1% w/w, about 3.2% w/w, about 3.3% w/w, about 3.4% w/w, about 3.5% w/w, about 3.6% w/w, about 3.7% w/w, about 3.8% w/w, about 3.9% w/w, about 4.0% w/w about 4.1% w/w, about 4.2% w/w, about 4.3% w/w, about 4.4% w/w, about 4.5% w/w, about 4.6% w/w, about 4.7% w/w, about 4.8% w/w, about 4.9% w/w, about 5.0% w/w about 5.1% w/w, about 5.2% w/w, about 5.3% w/w, about 5.4% w/w, about 5.5% w/w, about 5.6% w/w, about 5.7% w/w, about 5.8% w/w, about 5.9% w/w, about 6.0% w/w about 6.1% w/w, about 6.2% w/w, about 6.3% w/w, about 6.4% w/w, about 6.5% w/w, about 6.6% w/w, about 6.7% w/w, about 6.8% w/w, about 6.9% w/w, about 7.0% w/w about 7.1% w/w, about 7.2% w/w, about 7.3% w/w, about 7.4% w/w, about 7.5% w/w, about 7.6% w/w, about 7.7% w/w, about 7.8% w/w, about 7.9% w/w, about 8.0% w/w about 8.1% w/w, about 8.2% w/w, about 8.3% w/w, about 8.4% w/w, about 8.5% w/w, about 8.6% w/w, about 8.7% w/w, about 8.8% w/w, about 8.9% w/w, about 9.0% w/w about 9.1% w/w, about 9.2% w/w, about 9.3% w/w, about 9.4% w/w, about 9.5% w/w, about 9.6% w/w, about 9.7% w/w, about 9.8% w/w, about 9.9% w/w, about 10.0% w/w, about 10.1% w/w, about 10.2% w/w, about 10.3% w/w, about 10.4% w/w, about 10.5% w/w, about 10.6% w/w, about 10.7% w/w, about 10.8% w/w, about 10.9% w/w, about 11.0% w/w about 11.1% w/w, about 11.2% w/w, about 11.3% w/w, about 11.4% w/w, about 11.5% w/w, about 11.6% w/w, about 11.7% w/w, about 11.8% w/w, about 11.9% w/w, about 12.0% w/w about 12.1% w/w, about 12.2% w/w, about 12.3% w/w, about 12.4% w/w, about 12.5% w/w, about 12.6% w/w, about 12.7% w/w, about 12.8% w/w, about 12.9% w/w, about 13.0% w/w about 13.1% w/w, about 13.2% w/w, about 13.3% w/w, about 13.4% w/w, about 13.5% w/w, about 13.6% w/w, about 13.7% w/w, about 13.8% w/w, about 13.9% w/w, about 14.0% w/w about 14.1% w/w, about 14.2% w/w, about 14.3% w/w, about 14.4% w/w, about 14.5% w/w, about 14.6% w/w, about 14.7% w/w, about 14.8% w/w, and about 14.9% w/w.

In one aspect, the sphingan is a native sphingan; an unclarified sphingan; a low acyl, unclarified sphingan; a low acyl, clarified sphingan; or a combination thereof. In yet another aspect, the sphingan is a low acyl, clarified gellan.

A native sphingan may include, for example, gellan (viz., a high acyl gellan, S-60), welan (S-130), rhamsan (S-194), diutan (S-657), S-88, S-198, and S-7 comprised of a substituted or unsubstituted tetrameric saccharide ("tetramer") depicted generally as $[(\rightarrow 3)Glc(\beta 1 \rightarrow 4)GlcA(\beta 1 \rightarrow 4)Glc(\beta 1 \rightarrow 4)Rha(\alpha 1 \rightarrow)]n$, where Glc and GlcA are D-sugars, while Rha is an L-sugar, and, where applicable, Man is an L-sugar. Bezanson 2012 describes examples of a clarified sphingan. The chemical structures of selected sphingans are depicted below showing the abbreviated terms for the individual monosaccharides (e.g., $(1 \rightarrow 3)Glc$, $(1 \rightarrow 4)GlcA$, $(1 \rightarrow 4)Glc$, and $(1 \rightarrow 4)Rha$)).

| Sphingan | $R_1$ | $R_2$ | $R_3$ | $R_4$ | $R_5$ | $R_6$ |
|---|---|---|---|---|---|---|
| HA Gellan | Ac or H | Glyc | M | H | H | H |
| LA Gellan | H | H | M | H | H | H |
| Diutan | Ac or H | Ac or H | M | H | Rha($\alpha 1 \rightarrow 4$)-Rha($\alpha 1 \rightarrow$) | H |
| Rhamsan[a] | Glc($\beta 1 \rightarrow 6$)-Glc($\alpha 1 \rightarrow$) | H | M | H | H | H |
| Welan | H | Ac | M | H | Rha($\alpha 1 \rightarrow$) or Man($\alpha 1 \rightarrow$) | H |

Abbreviations: Glc (D-glucopyranosyl), GlcA (D-glucopyranosyluronic acid), Rha (L-rhamnopyranosyl), Ac (Acetyl), Glyc (L-Glycerate), Man (L-mannopyranosyl).

[a]Rhamsan contains approximately one O-acetyl group per tetramer, distributed over secondary positions.

The term "M," as used herein, refers to a physiologically acceptable cation including, for example, a proton ($H^+$, e.g., hydronium), sodium ($Na^+$), potassium ($K^+$), calcium ($Ca^{2+}$), magnesium ($Mg^{2+}$), ammonium ($NH_4^+$), or a combination thereof. For a low acyl, clarified gellan, M is typically $Na^+$, $K^+$, or a combination thereof. In certain instances, M for a low acyl, clarified gellan may be Na+, K+, $Ca^{2+}$, or a combination thereof. However, it will be appreciated that cation exchange may occur for a given sphingan depending on the type of salt that contacts the sphingan. Thus, in certain aspects, it may be of interest to limit contact to certain elements, e.g., divalent calcium, because of cation exchange.

The value of "n" refers to a whole or fractional number and refers to the number of tetrameric units that may be substituted or unsubstituted. It is understood that certain native sphingans have a value of n that may be correlated with the molecular weight of the native sphingan (e.g., native gellan gum having MW≈$2.5 \times 10^6$ and MN≈$2.2 \times 10^6$). Clark 2001.

The expression "degree of polymerization" or DP, as used herein, refers to the number of monosaccharide units in the polysaccharide or oligosaccharide chain. For instance, with reference to the chemical structure depicted above, where n is four, the DP is sixteen. With reference to the chemical structure depicted above, where n is four, DP is sixteen, and thus a sphingan oligosaccharide having a DP of sixteen may include four GlcA moieties. Thus, the expression sphingan oligosaccharide, as used herein, may refer to a sphingan oligosaccharide or a salt thereof, such as, a sodium($Na^+$)-sphingan oligosaccharide or a mixed salt form, such as a sodium($Na^+$)/potassium($K^+$)-sphingan oligosaccharide.

In one aspect, the liquid medium comprises municipal water (e.g., tap/city water or a community supplied water), a deionized water, an ion-exchanged water, a distilled water, a reverse-osmosis water, a fermentation broth, or a combination thereof. The liquid medium may further comprise an organic solvent, such as a water-miscible soluble organic solvent, e.g., methanol, ethanol, isopropanol, acetone, acetonitrile, ethylene glycol, diethylene glycol, dimethylsulfoxide, and the like. The amount of the organic solvent may range from about 1% w/w to about 50% w/w, and all integer/sub-integer values in between.

In one aspect of the process, the providing of step (a) comprises (i) dispersing a solid sphingan in the liquid medium or (ii) using a fermentation broth comprising a dispersed sphingan.

One may appreciate that the amount of solid acid may vary depending on the type of sphingan used in the process. As contemplated herein, the solid acid comprises a functional group that comprises an anionic moiety and a cationic moiety, where the anionic moiety may be, e.g., a sulfonate (i.e., $RSO_3^-$), and the cationic moiety may be a proton (i.e., $H^+$). One also may appreciate that a sphingan, where M is $Na^+$, may undergo cation exchange in the presence of the solid acid, which results in the conversion of the solid acid to an exchanged solid acid, which may be regenerated as described herein. That is, the sphingan comprising a D-glucopyranosyluronic acid unit (i.e., GlcA) may be in the sodium form ($R_3=Na^+$), but when exposed to the solid acid, may be converted to the protonated form ($R_3=H^+$, by $Na^+/H^+$-exchange. Thus, the amount of solid acid may be an amount to accommodate the amount of cationic sodium present originally in the sphingan, plus an amount to effect hydrolysis of a glycosidic bond present in the sphingan to obtain a sphingan oligosaccharide, and, if present, an amount of residual salt that may be present in the sphingan.

In some instances, it may be desirable to use a sphingan where the D-glucopyranosyluronic acid unit (i.e., GlcA) may be partially, mostly, or completely in the protonated form. In that situation, a concomitant decreased amount of solid acid may be used because a reduced amount of cation (e.g., sodium) exchange will occur when the sphingan is exposed to the solid acid. In that situation, it may be desirable to add an effective amount of salt (e.g., sodium chloride, potassium chloride, etc.) to effectuate ion-exchange with a concomitant increase in medium acidity.

Generally, an effective amount of a solid acid refers to an amount of solid acid that increases the concentration of hydronium ion (e.g., $H_3O^+$) thereby decreasing the pH of the sphingan composition to obtain an acidified sphingan composition. An increased concentration of hydronium ion serves to promote hydrolysis of one or more glycosidic bonds in the sphingan.

In an aspect of the process, the weight amount of the solid acid, relative to the sphingan, ranges from about 0.1 to about 20, and all values in between including for example, about 0.2, about 0.3, about 0.4, about 0.5, about 0.6, about 0.7, about 0.8, about 0.9, about 1.0, . . . about 2, about 3, about 4, about 5, about 6, about 7, about 8, about 9, about 10, about 11, about 12, about 13, about 14, about 15, about 16, about 17, about 18, and about 19. For example, the amount of sphingan is about 100 g, then the amount of solid acid, relative to the sphingan may be about 100 g to about 2000 g.

In another aspect of the process, one may appreciate that when the solid acid is present in a column, contacting the sphingan composition with an effective amount of solid acid may lead to a reduction of the pH as the sphingan composition passes through the column—thereby providing the acidified sphingan composition and providing a pH gradient between the influent and the effluent. Thus, the weight amount of the solid acid, relative to the sphingan, may depend on the desired pH of the acidified sphingan composition. Accordingly, in this aspect, the weight amount of the solid acid is sufficient to adjust pH of the sphingan composition to about 4.5 or lower, about 3.5 or lower, about 2.5 or lower, about 2 or lower, about 1.5 or lower, or about 1 or lower.

In one aspect of the process, the acidified sphingan composition has a pH of from about 0 to about 6 and all values in between, such as about 0.5, about 1.0, about 1.5, about 2.0 about 2.5, about 3.0, about 4.0, about 4.5, about 5.0, and about 5.5. For instance, the acidified sphingan composition has a pH of from about 1.5 to about 4.5. Alternatively, the acidified sphingan composition has a pH of from about 1.5 to about 4.

The reaction temperature of the hydrolyzing (e.g., step (c1) or step (c2)) contemplated herein may depend on, for example, the sphingan to be hydrolyzed, the pH, and gelling ions. For a high-acyl gellan, it may be desirable to conduct hydrolysis at a temperature at or above the high-acyl gellan gel point (e.g., about 70° C. to about 80° C.). Thus, for a high-acyl gellan, a hydrolysis temperature may range, for example, from about 80° C. to about 140° C. and all values in between, including, for example, about 85° C., about 90° C., about 95° C., about 100° C., about 105° C., about 110° C., about 115° C., about 120° C., about 125° C., about 130° C., and about 135° C. For a low-acyl gellan, it may be desirable to conduct the hydrolyzing at a temperature at or above the low-acyl gellan point (e.g., about 25° C. to about 60° C.). Therefore, for a low-acyl gellan, a temperature of the hydrolyzing may range, for example, from about 35° C. to about 110° C. and all values in between, including, for example, about 40° C., about 45° C., about 50° C., about 55° C., about 60° C., about 65° C., about 70° C., about 75° C., about 80° C., about 85° C., about 90° C., about 95° C., about 100° C., and about 105° C.

One may appreciate that the manner of mixing achieved for step (a) (providing a sphingan composition comprising a sphingan and a liquid medium comprising a water) may impact the sphingan hydrolysis rate. For instance, dispersion of a powdered sphingan (e.g., low acyl gellan) using a high-shear mixing system comprising a rotor-stator mixer (e.g., about 1500 rpm and high intensity) produces hydraulically generated shear thinning thereby effectively increasing the amount of sphingan in contact with the liquid medium. The rotation for the high-shear mixing system may range from about 5 rpm to about 3000 rpm, including all values in between.

The contacting and/or hydrolyzing may be performed under ambient, sub-ambient, or supra-ambient pressures, e.g., from about 0.7 bar to about 3 bar and all values in between, such as, for example about 0.8 bar, about 0.9 bar, about 1.0 bar, about 1.1 bar, about 1.2 bar, about 1.3 bar, about 1.4 bar, about 1.5 bar, about 1.6 bar, about 1.7 bar, about 1.8 bar, about 1.9 bar, about 2.0 bar, about 2.1 bar, about 2.2 bar, about 2.3 bar, about 2.4 bar, about 2.5 bar, about 2.6 bar, about 2.7 bar, about 2.8 bar, and about 2.9 bar.

In an aspect of the process, the solid acid comprises a silica based solid acid, a zeolite based solid acid, a clay based solid acid, a polymer based solid acid, a carbon based solid acid, an acid treated activated carbon, a hydroxyapatite based solid acid, a zirconia based solid acid, a niobium based solid acid, or a combination thereof.

Examples of solid acids have been previously reported. See, e.g., Leib 1966, Torres 2016, Gupta 2014, Liu 2018, Okuhara 2002, Suganuma 2008. Further, numerous polymer-based solid acids are available commercially, as disclosed by Dardel, and as shown below.

| PRODUCER | TRADEMARK | NAME | MATRIX | COMMENTS |
| --- | --- | --- | --- | --- |
| ION EXCHANGE INDIA | INDION | 104 | Styrenic macro | Dry, 4.8 eq/kg |
| ION EXCHANGE INDIA | INDION | 130Dry | Styrenic gel | Dry, 4.8 eq/kg, high divinylbenzene ("DVB") |
| ION EXCHANGE INDIA | INDION | 140Dry | Styrenic gel | Dry, 4.8 eq/kg, moderate DVB |
| DUPONT | AMBERLYST | 19 | Styrenic gel | 1.8 eq/L, moisture holding capacity ("MHC") 48-54%, 0.4-1.2 mm |
| ION EXCHANGE INDIA | INDION | 190Dry | Styrenic macro | 4.7 eq/L |
| LANXESS | LEWATIT MDS | 2568 | Styrenic macro | Monodisperse |
| DUPONT | AMBERLYST | 35DRY | Styrenic macro | Supersulphonated, 5.4 eq/kg, 0.3-0.9 mm, 50 m2/g, 0.35 ml/g, 300 μ |
| DUPONT | AMBERLYST | 45 | Styrenic macro | 1.2 eq/L, 2.95 eq/kg, MHC 51-55%, 0.4-1.2 mm, uniformity coefficient ("UC") 1.5 |
| ION EXCHANGE INDIA | INDION | 790 Na | Styrenic macro | MHC 46-51% 1.9 eq/L |
| DUPONT | DOWEX | 88 | Styrenic macro | 1.8 eq/L, MEW 42-48%, 0.3-1.2 mm |
| DUPONT | DOWEX Monosphere | 88 | Styrenic macro | 1.8 eq/L, MHC 42-50%, 550 μm, 95% ± 150 μm |
| DUPONT | DOWEX | 88 H | Styrenic macro | 1.7 eq/L H, MHC 50-56%, 0.3-1.2 mm |
| DUPONT | DOWEX | 88MB | Styrenic macro | 1.8 eq/L, MHC 42-48%, 0.5-1.2 mm |
| DUPONT | DOWEX | 88MB H | Styrenic macro | 1.7 eq/L, MEW 50-56%, 0.5-1.2 mm |
| JACOBI CARBONS | RESINEX | CAT4 | Styrenic macro | 1.8 eq/L MHC 50-60% 450-1250 μm UC 1.6 |
| LANXESS | LEWATIT | K1131S | Styrenic gel | Very low DVB, 5 eq/kg, MHC 78-82% |
| LANXESS | LEWATIT | K1137 | | No details |
| LANXESS | LEWATIT | K1221 | Styrenic gel | Low DVB, 1.2 eq/L MHC 65-70%, 130° C. |
| LANXESS | LEWATIT | K1261 | Styrenic gel | No details |
| LANXESS | LEWATIT | K1267 | Styrenic gel | No details |
| LANXESS | LEWATIT | K1461 Black | Styrenic gel | Monodisperse, 650 μm, MHC 47-53% (H), 1.8 eq/L |
| LANXESS | LEWATIT | K2420 | Styrenic macro | 1.4 eq/L, 5.4 eq/kg |
| PUROLITE | PUROFINE | PFC150S | Styrenic macro | Uniform, fine: 520-620 μm |
| MITSUBISHI | DIAION | PK208 | Styrenic macro | Very high moisture (58-68), 1.2 eq/L |

-continued

| PRODUCER | TRADEMARK | NAME | MATRIX | COMMENTS |
|---|---|---|---|---|
| LANXESS | LEWATIT | S1568 | Styrenic gel | 2 eq/L, UC 1.1, mean bead size 550-650 μm, total capacity 2.0 eq/L; density 1.3 g/mL, MHC 45-50% |
| PUROLITE | SHALLOW SHELL | SSTPPC60 | Styrenic gel | 3.8 eq/kg, uniform 650 μm |
| PUROLITE | SHALLOW SHELL | SSTPPC65 | Styrenic gel | 3.7 eq/kg Na, 650 μm UC 1.25 |
| PUROLITE | SHALLOW SHELL | STTC60 | Styrenic gel | 3.8 eq/kg |
| PUROLITE | SHALLOW SHELL | STTC60 H | Styrenic gel | 4.0 eq/kg H |
| PUROLITE | SHALLOW SHELL | STTC65 | Styrenic gel | 3.7 eq/kg Na |
| PUROLITE | SHALLOW SHELL | STTC80DL | Styrenic gel | 4.0 eq/kg Na |
| THERMAX | TULSION | T38 | Styrenic gel | Low DVB 1.4 eq/L, MHC 68% |
| THERMAX | TULSION | T3825 | Styrenic gel | Low DVB 0.8 eq/L, MHC 79% |
| THERMAX | TULSION | T3830 | Styrenic gel | Promoted catalyst, wet, 3.5 eq/kg, MHC 65% |
| THERMAX | TULSION | T56MP | Styrenic macro | 1.7 eq/L, MHC 50%, 0.3-1.2 mm |
| THERMAX | TULSION | T62MP | Styrenic macro | Dry, 4.8 eq/kg |
| THERMAX | TULSION | T63MP | Styrenic macro | Dry, high porosity, 4.9 eq/kg |
| THERMAX | TULSION | T66MP | Styrenic macro | Low porosity & high surface area, 5.0 eq/kg |

In one aspect, the solid acid may be any one of the polymer-based solid acids identified herein.

In another aspect, the solid acid may be obtained commercially from Lanxess, under the tradename, LEWATIT® S 1568. The S1568 resin comprises a styrenic polymer backbone comprising a sulfonic acid moiety. The S1568 resin is commercially available as the $Na^+$-form, which may be converted to the $H^+$-form, as explained herein. The S1568 resin has a total capacity of about 1.8 eq/L, a uniformity coefficient of about 1.1, mean bead size about 550 μm to about 650 μm, a density 1.3 g/mL, a moisture holding capacity of from about 45% to about 50%, and a stability temperature range of about 1° C. to about 120° C.

In yet another aspect, the solid acid comprises a sulfonic acid-containing styrenic backbone having a total capacity of about 1 eq./L to about 2 eq./L and all values in between, such as 1.2 eq./L, 1.4 eq./L, about 1.6 eq./L, and about 1.8 eq./L.

In a further aspect, the solid acid comprises a sulfonic acid-containing styrenic backbone having a total capacity of about 1.8 eq./L and is present in an amount, relative to sphingan, of from about 2 to about 10, including all values in between, for example about 3, about 4, about 5, about 6, about 7, about 8, and about 9. For example, in the instance where the amount of sphingan is about 200 g, the amount of solid acid then the amount of solid acid, relative to the sphingan may be about 200 g to about 2000 g.

Alternatively, in a further aspect the solid acid comprises a sulfonic acid-containing styrenic backbone having a total capacity of about 1.8 eq./L and is present in an amount sufficient to adjust pH of sphingan composition to about 4.5 or lower, about 3.5 or lower, about 2.5 or lower, about 2 or lower, about 1.5 or lower, or about 1 or lower.

In an aspect of the process, the acidified sphingan composition has a pH of from about 0 to about 6, and all values in between, for example, about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, and about 3.9, about 4.0, about 4.1, about 4.2, about 4.3, about 4.4, about 4.5, about 4.6, about 4.7, about 4.8, and about 4.9, about 5.0, about 5.1, about 5.2, about 5.3, about 5.4, about 5.5, about 5.6, about 5.7, about 5.8, and about 5.9. In one aspect, the acidified sphingan composition has a pH of from about 0.5 to about 2.5, and all values in between. In another aspect, the acidified sphingan composition has a pH of from about 1.5 to about 2.5, and all values in between.

One may appreciate that a pH gradient may exist in the acidified sphingan composition, which depends on the proximity to the solid acid. For instance, a portion of the acidified sphingan composition furthest removed from the solid acid may have a pH of about 6, while a portion of the acidified sphingan composition in close proximity to the solid acid may have a pH of about 0, or lower since certain solid acids may be considered to be superacids. Okuhara 2002 at 3652. In another aspect, the acidified sphingan composition has a pH of from about −3.0 to about 3.0, and all values in between, such as about −2, about −1, about 0, about 1, and about 2. In the instance where the solid acid is held in a column, then one may appreciate that there may be two or more pH gradients depending on the column location, e.g., influent versus effluent. In practice, the pH of the acidified sphingan composition (e.g., batch process or column process (e.g., effluent)) may be 6 or lower, where the amount of hydronium ion may influence the rate of hydrolysis of the sphingan to sphingan oligosaccharide. Accordingly, the pH of the acidified sphingan composition may range from about 2 to about 5, from about 3 to about 4.

It is contemplated that the process may provide for a differing amount of sphingan oligosaccharides. For instance, it is contemplated that the ratio of certain oligosaccharides may vary depending on the process conditions. That is, the ratio of an oligosaccharide having a degree of polymerization of 5 or more (viz., oligo-≥penta) with respect to an oligosaccharide having a degree of polymerization of 4 (viz., oligo-tetra) may vary depending on the reaction conditions, such as pH and time. In one aspect, the process produces a sphingan oligosaccharide having an oligo-≥penta/oligo-tetra ratio that ranges of from 1 to about 30, and all values in between, for example, about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, and about 29.

In certain instances, it may be desirable to reduce further an amount of residual salt content of the sphingan oligosaccharide composition by contacting the sphingan composition with a solid base and/or contacting the sphingan oligosaccharide composition with a solid base. Alternatively, residual salt reduction may occur by contacting the sphingan with a first solid base and contacting the sphingan oligosaccharide composition with a second solid base.

Accordingly, another aspect relates to a process for preparing a sphingan oligosaccharide composition, comprising: (a) providing a sphingan composition comprising a sphingan and a liquid medium comprising a water; (b) contacting the sphingan composition with an effective amount of a solid acid to obtain an exchanged solid acid and an acidified sphingan composition; (c1) separating the acidified sphingan composition from the exchanged solid acid and hydrolyzing the acidified sphingan composition in the absence of the exchanged solid acid to obtain a sphingan hydrolysate composition; or (c2) hydrolyzing the acidified sphingan composition in the presence of the exchanged solid acid to obtain a sphingan hydrolysate composition and separating the exchanged solid acid from the sphingan hydrolysate composition; (d) adding a base to the sphingan hydrolysate composition to obtain the sphingan oligosaccharide composition having a pH of about 4 to about 8; and (e) contacting the sphingan composition with a solid base.

Yet another aspect relates to a process for preparing a sphingan oligosaccharide composition, comprising: (a) providing a sphingan composition comprising a sphingan and a liquid medium comprising a water; (b) contacting the sphingan composition with an effective amount of a solid acid to obtain an exchanged solid acid and an acidified sphingan composition; (c1) separating the acidified sphingan composition from the exchanged solid acid and hydrolyzing the acidified sphingan composition in the absence of the exchanged solid acid to obtain a sphingan hydrolysate composition; or (c2) hydrolyzing the acidified sphingan composition in the presence of the exchanged solid acid to obtain a sphingan hydrolysate composition and separating the exchanged solid acid from the sphingan hydrolysate composition; (d) adding a base to the sphingan hydrolysate composition to obtain the sphingan oligosaccharide composition having a pH of about 4 to about 8; and (e) contacting the sphingan oligosaccharide composition with a solid base.

Yet another aspect relates to a process for preparing a sphingan oligosaccharide composition, comprising: (a) providing a sphingan composition comprising a sphingan and a liquid medium comprising a water; (b) contacting the sphingan composition with an effective amount of a solid acid to obtain an exchanged solid acid and an acidified sphingan composition; (c1) separating the acidified sphingan composition from the exchanged solid acid and hydrolyzing the acidified sphingan composition in the absence of the exchanged solid acid to obtain a sphingan hydrolysate composition; or (c2) hydrolyzing the acidified sphingan composition in the presence of the exchanged solid acid to obtain a sphingan hydrolysate composition and separating the exchanged solid acid from the sphingan hydrolysate composition; (d) adding a base to the sphingan hydrolysate composition to obtain the sphingan oligosaccharide composition having a pH of about 4 to about 8; and (e) contacting the sphingan composition with a first solid base and the sphingan oligosaccharide composition with a second solid base.

The solid base may be a polymer-based solid base and may be characterized as a strong base anion ("SBA") or weak base anion ("WBA") resin. Numerous polymer-based solid bases are available commercially, as disclosed by Dardel, including, for example, Aldex (e.g., ALDEX SB1P OH), DuPont (e.g., AMBERLITE HPR4200 OH, DOWEX 22 OH, or DOWEX 66), Suzhou (BESTION BA2220H), Ion Exchange India (e.g., INDION 810 OH), Lanxess (e.g., LEWATIT ASB1 OH or LEWATIT S4328), Purolite (e.g., PUROFINE PFA400 OH or PUROLITE A300 OH, PUROLITE A300 MB OH, or PUROLITE A103 SPlus), etc. In one aspect, the polymer-based solid base may be in the hydroxide form (viz., OH form).

One may appreciate that contacting the sphingan composition and/or the sphingan oligosaccharide composition with a solid base may result in the formation of an exchanged solid base where the residual salt content may be reduced. For instance, one may realize that the sphingan composition and/or the sphingan oligosaccharide may comprise one or more residual salts, e.g., a residual salt comprising anionic sulfate and anionic phosphate. For example, suppose the sphingan oligosaccharide composition comprises a sulfate salt and a phosphate salt. Contacting the sphingan oligosaccharide composition with the solid base may result in the formation of an exchanged solid base and a sphingan oligosaccharide composition having a reduced amount of residual salt. In the instance where the solid base is in an $OH^-$-form, contacting the sphingan oligosaccharide composition with the solid base may result in a decrease in hydronium ion concentration, due to the liberation of hydroxide ($OH^-$) from the solid base. Accordingly, contacting the sphingan oligosaccharide composition with a solid base may result in the sphingan oligosaccharide composition having a pH of about 4 or higher. If the pH exceeds a target pH (e.g., pH of about 8), it may be necessary to adjust the pH be adding a strong acid (e.g., HCl or $HNO_3$) or bubbling gaseous carbon dioxide into the solution thereby forming carbonic acid ($H_2CO_3$). One may appreciate that further pH adjustment by adding a strong acid (or bubbling gaseous carbon dioxide) may result in a further increase in the residual salt content, such as, chloride ($Cl^-$), nitrate ($NO_3^-$), bicarbonate ($HCO_3^-$), or carbonate ($CO_3^{2-}$). Accordingly, an aspect relates to a process for preparing a sphingan oligosaccharide composition, comprising: (a) providing a sphingan composition comprising a sphingan and a liquid medium comprising a water; (b) contacting the sphingan composition with an effective amount of a solid acid to obtain an exchanged solid acid and an acidified sphingan composition; (c1) separating the acidified sphingan composition from the exchanged solid acid and hydrolyzing the acidified sphingan composition in the absence of the exchanged solid acid to obtain a sphingan hydrolysate composition; or (c2) hydrolyzing the acidified sphingan composition in the presence of the exchanged solid acid to obtain a sphingan hydrolysate composition and separating the exchanged solid acid from the sphingan hydrolysate composition; (e1) contacting the sphingan hydrolysate composition with a solid base to obtain a low-salt, sphingan oligosaccharide composition; and (e2) optionally, adjusting the pH of the low-salt, sphingan oligosaccharide composition to a value of about 4 to about 8.

In the process disclosed herein, adding a base to the sphingan oligosaccharide amounts to a pH adjustment where the adjusted pH ranges from about 4 to about 8 and all values in between, such as about 4.5, about 5.0, about 5.5, about 6.0, about 6.5, about 7.0, and about 7.5.

Suitable bases used for the pH adjustment may include, e.g., sodium hydroxide, potassium hydroxide, ammonium hydroxide, magnesium hydroxide, calcium hydroxide, or another suitable base, such as, for example, a carbonate salt, e.g., an alkali metal carbonate (e.g., sodium carbonate, sodium bicarbonate, potassium carbonate, potassium bicarbonate, or a mixture thereof). It will be appreciated that the base used may dictate the salt-form of the sphingan oligosaccharide. For instance, if the base added to the second composition comprises sodium hydroxide, then the sphingan oligosaccharide may comprise a sodium-form of GlcA, if present, and thus the sphingan oligosaccharide may comprise cationic sodium ($Na^+$). Further, sodium may be replaced by calcium. Accordingly, in another aspect of the process, the hydrolyzing occurs in a system (e.g., an autoclave) that is substantially free of divalent calcium.

The process disclosed herein may include additional processing steps for the sphingan oligosaccharide composition, such as, (f) contacting with a filter system; (g) concentrating; (h) centrifugation; (i) drying; and (j) packaging.

The process disclosed herein may include step (f) contacting the sphingan oligosaccharide composition with a filter system. The filter system may be a conventional system designed to separate solids from liquids. See, e.g., Vogel's. The filter system may have the capacity to separate components of the sphingan oligosaccharide composition based on molecular weight. For instance, the filter system may have a molecular weight cutoff of about 0.5 kDa to about 10 kDa and all values in between, such as 1 kDa, 1.5 kDa, 2 kDa, 2.5 kDa, 3 kDa, 3.5 kDa, 4 kDa, 4.5 kDa, 5 kDa, 5.5 kDa, 6 kDa, 6.5 kDa, 7 kDa, 7.5 kDa, 8 kDa, 8.5 kDa, 9 kDa, and 9.5 kDa. Use of a filter system having a certain molecular weight cutoff may permit exclusion of certain components from the sphingan oligosaccharide composition, such as, a monosaccharide (e.g., Glc, GlcA, and/or Rha) or an unreacted sphingan or a sphingan polysaccharide. The filter system may further comprise a sterile filtration filter (e.g., for bacteria/spore removal e.g. 0.45 µm, 0.22 µm) and/or ultrafiltration using suitable molecular weight cutoff of about 300 kDa or about 150 kDa.

The process disclosed herein may further comprise subjecting the sphingan oligosaccharide composition to (g) concentrating; (h) centrifugation; (i) drying; and (j) packaging. For instance, the process may further comprise drying the sphingan composition in the presence or absence of reduced atmospheric pressure. Additionally, the process may further comprise centrifugation of the sphingan oligosaccharide composition to separate, e.g., unwanted solids, from the sphingan oligosaccharide composition, e.g., by collection of the resultant centrifugation supernatant.

The process disclosed herein results in a sphingan oligosaccharide composition having a residual salt content of: (i) not more than about 5% by weight based on the weight of the sphingan oligosaccharide, (ii) not more than about 1% by weight based on the weight of the sphingan oligosaccharide, or (iii) not more than about 0.5% by weight based on the weight of the sphingan oligosaccharide.

The process disclosed herein also results in a sphingan oligosaccharide composition having a residual salt content of from about 0.001% to about 0.5% by weight of the composition, and all values in between, as explained below.

Thus, an aspect relates to a sphingan oligosaccharide prepared by any one of the processes disclosed herein.

One may appreciate that a sphingan oligosaccharide may include one or more D-glucopyranosyluronic acid moieties (viz., GlcA). Depending on the pH, the GlcA moiety may be protonated or deprotonated. When deprotonated, a sphingan oligosaccharide having a GlcA moiety may be a salt. Further, a GlcA monosaccharide, when deprotonated, also may be a salt. For the avoidance of doubt, a residual salt content does not reflect a sphingan oligosaccharide having a GlcA moiety. Further, a low residual salt content does not reflect a GlcA monosaccharide, or for that matter a monosaccharide or an oligosaccharide derived from the sphingan.

In an aspect of the composition disclosed herein, the residual salt comprises a salt of an inorganic acid, a salt of an organic acid, or a combination thereof. For example, the inorganic acid may be sulfuric acid, hydrochloric acid, nitric acid, and phosphoric acid. Additionally, the organic acid may be lactic acid, citric acid, oxalic acid, formic acid, acetic acid, trifluoroacetic acid, or a combination thereof. Examples of salts include alkali (e.g., $Na^+$ and $K^+$) and/or alkaline earth metals (e.g., $Mg^{2+}$ and $Ca^{2+}$) of sulfuric acid, hydrochloric acid, nitric acid, phosphoric acid, lactic acid, citric acid, oxalic acid, formic acid, acetic acid, trifluoroacetic acid, or a combination thereof.

In an aspect of the composition, the residual content is not more than about 5% by weight based on the weight of the sphingan oligosaccharide, including for example, not more than about 4%, not more than about 3%, not more than about 2%, not more than about 1%, and not more than about 0.5%.

In another aspect of the process, the sphingan oligosaccharide composition has a residual salt content of from about 0.001% to about 0.5% by weight of the composition, and all values in between, such as, for example, about 0.002%, about 0.003%, about 0.004%, about 0.005%, about 0.006%, about 0.007%, about 0.008%, about 0.009%, about 0.01%, about 0.012%, about 0.013%, about 0.014%, about 0.015%, about 0.016%, about 0.017%, about 0.018%, about 0.019%, about 0.02%, about 0.022%, about 0.023%, about 0.024%, about 0.025%, about 0.026%, about 0.027%, about 0.028%, about 0.029%, about 0.03%, about 0.032%, about 0.033%, about 0.034%, about 0.035%, about 0.036%, about 0.037%, about 0.038%, about 0.039%, . . . about 0.1%, about 0.12%, about 0.13%, about 0.14%, about 0.15%, about 0.16%, about 0.17%, about 0.18%, about 0.19%, about 0.2%, about 0.21%, about 0.22%, about 0.23%, about 0.24%, about 0.25%, about 0.26%, about 0.27%, about 0.28%, about 0.29%, about 0.3%, about 0.31%, about 0.32%, about 0.33%, about 0.34%, about 0.35%, about 0.36%, about 0.37%, about 0.38%, about 0.39%, about 0.4%, about 0.41%, about 0.42%, about 0.43%, about 0.44%, about 0.45%, about 0.46%, about 0.47%, about 0.48%, and about 0.49%.

In another aspect of the composition disclosed herein, the residual salt is a sodium salt or a potassium salt of sulfuric acid, hydrochloric acid, nitric acid, phosphoric acid, citric acid, oxalic acid, formic acid, acetic acid, trifluoroacetic acid, or a combination thereof.

In that regard, disclosed herein is a composition comprising: a sphingan oligosaccharide having a molecular weight of not more than about 10 kDa; and a residual salt content of: (i) not more than about 5% by weight based on the weight of the sphingan oligosaccharide, (ii) not more than about 1% by weight based on the weight of the sphingan oligosaccharide, or (iii) not more than about 0.5% by weight based on the weight of the sphingan oligosaccharide.

Also disclosed herein is a composition comprising: a sphingan oligosaccharide having a molecular weight of not more than about 5 kDa; and a residual salt content of: (i) not more than about 5% by weight based on the weight of the sphingan oligosaccharide, (ii) not more than about 1% by weight based on the weight of the sphingan oligosaccharide, or (iii) not more than about 0.5% by weight based on the weight of the sphingan oligosaccharide. As explained above, the FDA imposes restrictions for certain salts (e.g., residual salt). Additionally, a high salt content may lead to undesirable effects, such as bad taste or unwanted laxative properties. Thus, a sphingan oligosaccharide having a residual salt content of not more than about 0.5% by weight of the composition exhibits several advantageous properties.

Another aspect relates to an ingestible composition comprising: a prebiotic effective amount of any one of the compositions comprising a sphingan oligosaccharide having a low residual salt content (e.g., not more than about 0.5% w/w based on the sphingan oligosaccharide composition) and at least one ingestible ingredient.

In one aspect of the ingestible composition, the amount of sphingan oligosaccharide is present in an amount of from about 1% to about 100%, and all values in between, for example, about 2%, about 3%, about 4%, about 5%, about 6%, about 7%, about 8%, about 9%, about 10%, about 11% about 12%, about 13%, about 14%, about 15%, about 16%, about 17%, about 18%, about 19%, about 20%, about 21% about 22%, about 23%, about 24%, about 25%, about 26%, about 27%, about 28%, about 29%, about 30%, about 31% about 32%, about 33%, about 34%, about 35%, about 36%, about 37%, about 38%, about 39%, about 40%, about 41% about 42%, about 43%, about 44%, about 45%, about 46%, about 47%, about 48%, about 49%, about 50%, about 51% about 52%, about 53%, about 54%, about 55%, about 56%, about 57%, about 58%, about 59%, about 60%, about 61% about 62%, about 63%, about 64%, about 65%, about 66%, about 67%, about 68%, about 69%, about 70%, about 71% about 72%, about 73%, about 74%, about 75%, about 76%, about 77%, about 78%, about 79%, about 80%, about 81% about 82%, about 83%, about 84%, about 85%, about 86%, about 87%, about 88%, about 89%, about 90%, about 91% about 92%, about 93%, about 94%, about 95%, about 96%, about 97%, about 98%, and about 99%.

In yet another aspect, the ingestible composition may also comprise a probiotic and an additional prebiotic.

Examples of probiotics include, but are not limited to, *Lactobacillus rhamnosus* GG, *Bifidobacterium infantis*, *Lactobacillus acidophilus*, *Bifidobacterium lactis* HNO 19, *Bifidobacterium longum* (including Strain 35624), *Lactobacillus salivarius*, *Bifodobacterium bifidum*, *Lactobacillus plantarum*, *Lactobacillus paracasei*, *Bifidobacterium breve*, *Lactobacillus gasseri* KS-13, *Bacillus coagulans* (GBI-30, 6086), *Bacillus subtilis* DE111, each of which may be used alone or a combination thereof.

Examples of an additional prebiotic include, but are not limited to, inulin, a fructooligosaccharide, a galactooligosaccharide, a guar gum, a tara gum, a xanthan gum, a xanthanic polysaccharide, a xanthanic oligosaccharide, a konjac gum, a karaya gum, an arabinogalactan, lactulose, *psyllium*, a pectin, a pectinic polysaccharide, a pectinic oligosaccharide, citrus fiber, tragacanth, acacia, carrageenan, and the like.

Also contemplated herein is a use of the sphingan oligosaccharide for promoting beneficial bacterial growth in the colon of a mammal, said method comprising ingesting on an effective schedule a beneficial bacterial growth effective amount of a sphingan oligosaccharide disclosed herein and an ingestible medium.

Further contemplated herein is a use of the ingestible composition for promoting beneficial bacterial growth in the colon of a mammal, said method comprising ingesting on an effective schedule.

In one aspect the bacteria is *Blautia, Parabacteroides, Faecalibacterium, Clostridium* XVIII, or a combination thereof. In another aspect, the bacteria is *Faecalibacterium prausnitzii*. See, e.g., Morrison 2020 at paras. 167-172.

Unless defined otherwise, all technical and scientific terms used herein have the same meaning as commonly understood by one of ordinary skill in the art. The following examples are intended only to further illustrate the embodiments claimed and disclosed herein and are not intended to limit the scope of the claimed subject matter.

EXAMPLES

The embodiments described below illustrate a process for preparing a sphingan oligosaccharide having a residual salt content. For comparison, a comparative example is included to show preparation of a sphingan oligosaccharide having a salt content of 5% w/w or more.

Resin Generation/Regeneration. As a part of the process described herein, a resin may be present in a certain form, e.g., Na+-form. Accordingly, it is of interest to convert the resin form to an acidic (or H+-form). One may appreciate that resin generation/regeneration follows generally according to the resin-manufacturer technical data sheet in a column exerted to a continuous flow. The following information illustrates an exemplary process for converting the Na+-form to the H+-form.

1. The resin generation/regeneration may be done one or several days in advance of the sphingan oligosaccharide preparation.

2. Add 25 liters ("L") of ion exchanged water to a 30 L bucket.

3. Create a 3% (w/w) $H_2SO_4$ solution by slowly adding 1550 grams of 50% (w/w) sulfuric acid to the bucket while mixing.

4. Place 3 L (about 2875 g) of Lewatit S 1568 ion exchange resin in one of the 18 L buckets. Label it "Lewatit S1568 H+ form".

5. Pour 8 L of the 3% $H_2SO_4$ solution into the same vessel.

6. Agitate the resin+liquid for 20 minutes using a suitable mixing device.

7. Prepare a small filter with a filter cloth with 60-micron pore size (fine mesh).

8. Pour the resin solution through the filter, under vacuum (if necessary), and recover all the beads. Dispose the liquid. Try to minimize the amount of time that the beads are exposed to the atmosphere.

9. Pour the beads back into the 18 L vessel.

Repeat Step 5 through Step 9 ($2^{nd}$ acid treatment).

Repeat Step 5 through Step 8 ($3^{rd}$ acid treatment). During this step, use all the remaining 3% $H_2SO_4$ solution, approximately 9 L.

After separation of the beads in the $3^{rd}$ acid treatment, rinse them with approx. 5 L of ion exchanged water, while they are still residing on the filter cloth.

Rinse the 18 L vessel thoroughly with ion exchanged water.

Fill 6 L ion exchanged water into the 18 L vessel.

Pour the beads into the water. Try to minimize the amount of time that the beads are exposed to the atmosphere.

Agitate the resin+liquid for 10 minutes.

Prepare a small filter with a filter cloth with 60-micron pore size (fine mesh). If using the same cloth used in Step 7, be sure to wash it thoroughly.

Pour the resin solution through the filter, under vacuum (if necessary), and recover all the beads. Dispose the liquid.

After draining the resin, pour 3 L of ion exchanged water over the beads in the funnel.

Repeat Step 13 through Step 19 ($2^{nd}$ wash).

Repeat Step 13 through Step 19 ($3^{rd}$ wash). Measure and record the pH in the water of the $3^{rd}$ wash. The pH of the water wash was about 4.1.

Save the resin in a closed bag marked "Lewatit S1568 H+ form".

Resin Generation/Regeneration in column

The resin being used is purchased in a certain form, e.g., $Na^+$ form. The process below illustrates a process for converting the $Na^+$ form to the $H^+$ form in the column.

1. Pack the column with 463 mL of fresh or used resin beads.
2. Prepare 2 liters of 3% w/w solution using $H_2SO_4$ and deionized (DI) water.
3. Transfer the $H_2SO_4$ solution into a pressure bomb. The pressure bomb is connected to the column.
4. Use the needle valve attached to the final exit of the column to regulate flow.
5. Pressurize bomb to 15 psi and adjust the needle valve to get a flow rate of ~11 mL/min. It takes about 3 hours to flow all acid through the column.
6. Add 3 L DI water into the pressure bomb and use this to rinse the column over a 15 min period controlling the flow rate.
7. Repeat Step 6 for an additional DI water wash.

Example 1. Preparation of Sphingan Oligosaccharide Using about 3× Weight of Solid Acid 10 L of 90° C. ion-exchanged water was heated in the autoclave to 97° C. Weighed out 200 grams of KELCOGEL® (low acyl, clarified gellan) powder. Transferred the 97° C. liquid to a 30 L bucket. Slowly dispersed the powder into the water while using a rotostat, ensuring full dissolution of the KELCOGEL®. Agitated for about 2 min. Transferred the KELCOGEL® solution back to the autoclave and re-heated to 95° C. Added 0.6 L (about 625.3 g) of the regenerated S1568 resin (H+ form) to the autoclave. N.B. Addition of S1568 resin resulted in a medium pH of about 2.3. Increased the temperature of the solution to 95° C. and held it under agitation for 5 hours. A 250 mL sample was collected each hour starting after the first hour. Separated the resin from the liquid with a filter cloth, saved the liquid and set-aside the resin. Neutralized the liquid samples to pH~6.5 with 10% (w/w) NaOH after measuring pH of sample. In this example, the pH was adjusted to about 6.5, but in certain instances it may be desirable to obtain a pH of from about 5.5 to about 6.5.

Five samples collected each hour over a five-hour period had the following approximate pH-values: 2.2 (1 hr), 2.2 (2 hr), 2.2 (3 hr), 2.2 (4 hr), and 2.2 (5 hr).

After five hours, a 3 L sample was collected. Prepared a small filter with a filter cloth with 60-micron pore size (fine mesh). Poured the resin solution through the filter, under vacuum (if necessary), and recovered all the liquid, setting aside the beads. The liquid weight was about 2,640 g. Use about 40 g of 10% (w/w) sodium hydroxide to bring the sample to pH~6.5. Retained a 250 mL sample and labeled accordingly. The remainder of the liquid was placed in the drying cabinet. Once dry, the powder was ground with a mortar and pestle when dry. The autoclave was emptied and cleaned.

Example 2. Preparation of Sphingan Oligosaccharide Using 8× Weight of Solid Acid A similar procedure, as described in Example 1, was employed except that the amount of solid acid was increased. Namely, about 1.5 L (about 1,550 g) of the regenerated S1568 resins (H+ form) was added to the heated the KELCOGEL® solution.

Five samples collected each hour over a five-hour period had the following approximate pH-values: 1.79 (1 hr), 1.79 (2 hr), 1.8 (3 hr), 1.8 (4 hr), and 1.79 (5 hr).

Comparative Example

In this example, a sphingan oligosaccharide was prepared in a similar fashion except that sulfuric acid was used as a homogeneous acid catalyst.

The collected samples were analyzed for oligosaccharide content using size exclusion chromatography ("SEC") employed as a part of a flow injection polymer analysis ("FIPA"). The principle by SEC is that the molecules are separated on basis of size, the larger molecules elute first then the smaller molecules, then salts and finally ethanol. However, in the FIPA setup the pore size of the column is so small that all the large molecules (the polymer) are eluted at the same time but are separated from the salts and sugars. For analyses performed herein, a FIPA instrument (TDA 302 or TDA 305 from Viscotek/Malvern) was used operating with either (i) a Viscotek pump VE 1121GPC pump, a degasser, and an auto sampler AS3500 with Sample prep. module, Thermo Separation Products or (ii) GPCMax (Autosampler, pump and degasser). Columns used as a part of the FIPA include either BioBasis SEC60 (150×7.8 mm) from Thermo or Superdex Peptid from GE healthcare (60×7.8 mm) (self packed). Acquisition data collected using a suitable computer with OmniSEC software. The effluent from the column passes through four detectors, viz., refractive Index (RI), Right and Low Angle Laser Light Scattering (RALLS/LALLS), and a viscosity detector. The FIPA software converts the detector signals to intrinsic viscosity and concentration. Calibration standards include dextran T 70 approx. Mw 70,000 (dn/dc 0.147) and pullulan Mw 212,000 (dn/dc 0.147), and pullulan Mw 47,000 (dn/dc 0.147), where pectin (dn/dc: 0.145) may be used as a verification sample. For gellan oligomer do/dc: 0.145. A suitable eluent includes 0.3 M lithium acetate buffer (pH 4.6), with a flow rate of about 1 mL/min. The sample typically contains about 2 mg/mL of oligosaccharide sample in water containing about 0.5% v/v of ethanol.

FIG. 1 represents a typical FIPA chromatogram where all oligosaccharides elute from the FIPA system with retention volumes of about 3 mL to about 5 mL. One may appreciate that the FIPA process elutes sphingan oligosaccharides according to size, rather than by species. Thus, a certain pentasaccharide ("oligo-penta") may have the same approximate size as a certain tetrasaccharide ("oligo-tetra"). Accordingly, the FIG. 1 labels for the first three fractions (e.g., higher oligosaccharides ("oligo→penta"), pentasaccharides ("oligo-penta"), tetrasaccharides ("oligo-tetra")) are labels of convenience and may not accurately reflect the compositional makeup of the eluted components. In view of that qualifying information, the elution order for the sphingan oligosaccharides are: higher oligosaccharides ("oligo→penta"), pentasaccharides ("oligo-penta"), tetrasaccharides ("oligo-tetra"), trisaccharides ("oligo-tri"), and disaccharides ("oligo-di"). With reference to the sphingan chemical structure presented herein, one may appreciate that a tri-oligosaccharide has a degree of polymerization (or DP) of 3 and the oligosaccharides may include GlcGlcAGlc, GlcAGlcRha, GlcRhaGlc, and RhaGlcGlcA. Likewise, one will appreciate that oligo-di has a DP of 2, oligo-tetra has a DP of 4, etc. Additional components that elute after 5 mL retention volume include, for example, salts and monosaccharides.

One will see from the FIG. 1 FIPA chromatogram that certain peaks may not be well resolved. For instance, the oligo→penta peak appears to be unresolved with respect to the oligo-penta peak. Further, there is no baseline resolution between the oligo-≥penta peak(s) and the oligo-tetra peak. Accordingly, analysis of the amounts of oligosaccharides (e.g., oligo-tetra) may be skewed because of the absence of baseline resolution, as mass spectral analysis (e.g., LC-MS) showed that a collected fraction (e.g., oligo-≥penta) may have a certain amount of tetrasaccharide (viz., oligo-tetra).

Figure 2:
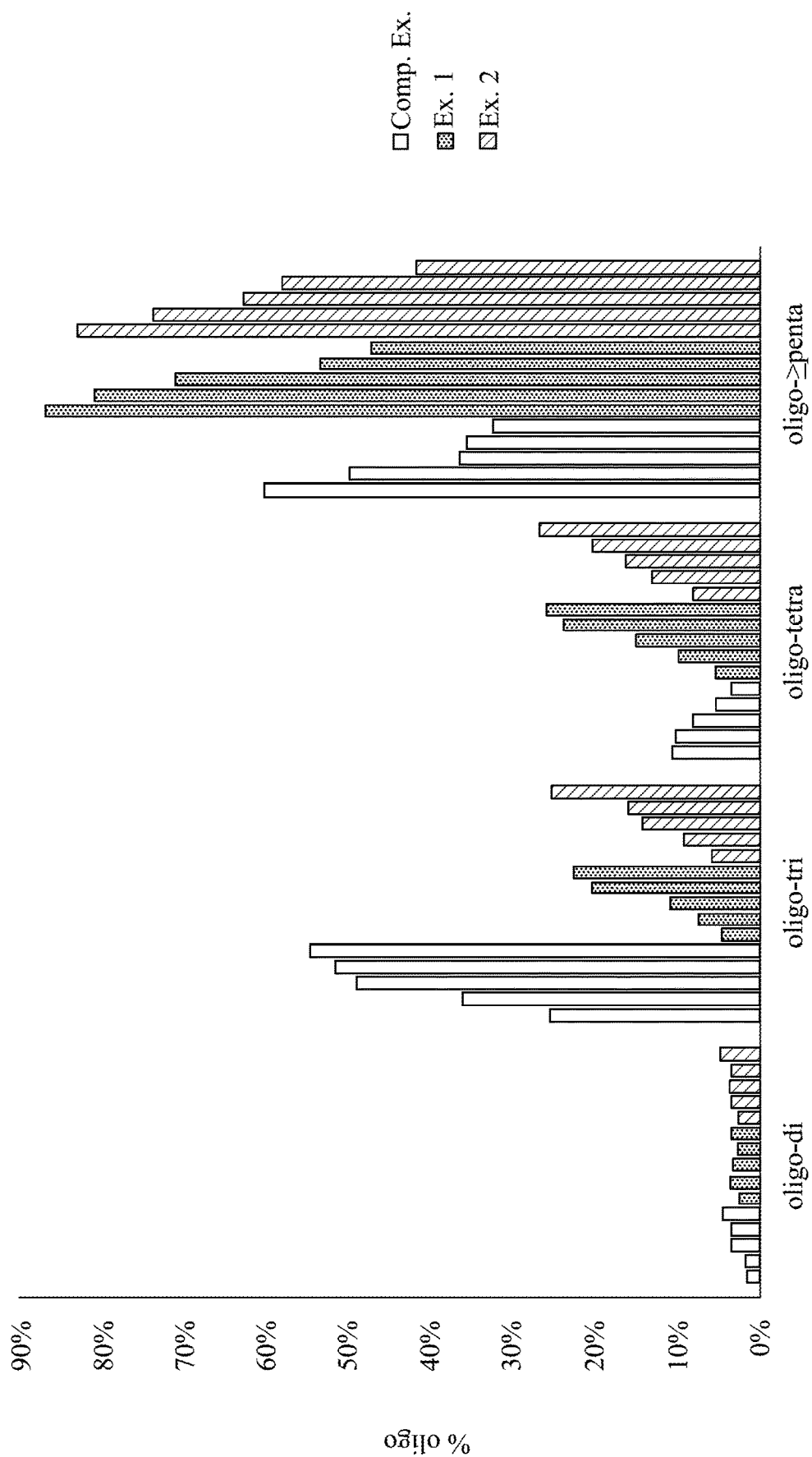
FIG. 2 presents a bar chart plot of sphingan oligosaccharides percentages, as measured from FIPA chromatogram, at different times (1-5 hr, from left to right) during reactions of a sphingan with a solid acid (Exs. 1-2) and with sulfuric acid (Comparative Example).

FIG. 2 depicts the estimated amounts of oligosaccharides, as determined from the FIPA chromatogram (e.g., FIG. 1), observed for the processes of Examples 1-2 and the Comparative Example. Table 1 summarizes the percentage amounts of di-oligosaccharides ("oligo-di"), tri-oligosaccharides ("oligo-tri"), tetra-oligosaccharides ("oligo-tetra"), as well as the remaining oligosaccharides including penta-oligosaccharides and higher oligosaccharides ("oligo-≥penta"), estimated from a FIPA chromatogram.

TABLE 1

Summary of percentage amounts of oligosaccharides for Exs. 1-2 and Comparative Example.

| Example | C (mg/mL) | Time (hr) | oligo-di | oligo-tri | oligo-tetra | oligo-≥penta |
|---|---|---|---|---|---|---|
| 1 | 0.982 | 1 | 2% | 4% | 5% | 87% |
|  | 0.951 | 2 | 3% | 8% | 10% | 81% |
|  | 1.027 | 3 | 3% | 11% | 15% | 71% |
|  | 1.008 | 4 | 3% | 20% | 24% | 54% |
|  | 1.004 | 5 | 3% | 23% | 26% | 47% |
| 2 | 0.9345 | 1 | 3% | 6% | 8% | 83% |
|  | 0.965 | 2 | 3% | 9% | 13% | 74% |
|  | 0.9695 | 3 | 4% | 14% | 16% | 63% |
|  | 0.9875 | 4 | 3% | 16% | 20% | 58% |
|  | 1.001 | 5 | 5% | 25% | 27% | 42% |
| Comparative | 1.4725 | 1 | 2% | 25% | 11% | 60% |
|  | 1.311 | 2 | 2% | 36% | 10% | 50% |
|  | 1.0505 | 3 | 3% | 49% | 8% | 37% |
|  | 1.1205 | 4 | 3% | 51% | 5% | 36% |
|  | 1.05 | 5 | 5% | 55% | 3% | 32% |

Again, certain oligosaccharide amounts (e.g., oligo-tetra) may be skewed because of the lack of baseline resolution of the FIPA peaks.

The FIG. 2 data illustrate several interesting observations, three of which are summarized as follows. First, it may be seen that a solid acid may be used in place of a strong mineral acid (e.g., sulfuric acid) in the preparation of a sphingan oligosaccharide. Second, the amounts of oligo-≥penta are greater at each time point for the solid acid treatment (Exs. 1-2) compared to the sulfuric acid treatment. Third, the solid acid treatment results in higher amounts oligo-tetra after longer periods of time.

Separate analyses of the salt content, as evidenced by, e.g., total sulfur content shows that the solid acid treatments have a low sulfur content (less than about 0.7% w/w), while the sulfuric acid treatment results in approximately a 10-fold greater sulfur content (about 5-7% w/w). Accordingly, the results show that a sphingan oligosaccharide manufactured by a process disclosed herein may have a residual salt level less than about 5% w/w, less than 1% w/w, or less than 0.5% w/w. In certain instances, where, for example, the sphingan composition comprises a sphingan (e.g., obtained from a fermentation broth), one may appreciate that additional residual salts may be present, e.g., sulfate and phosphate, among others. For instance, an amount of sulfate and phosphate (each calculated as potassium salt, e.g., $K_2SO_4$ and $K_3PO_4$) may be about 44 mg per gram of oligosaccharide composition (based on 99.9% confidence interval). Accordingly, it may be of interest to contact the fermentation broth with a solid base. Additionally, a further lowering of the residual salt content may be achieved by contacting the sphingan oligosaccharide composition (obtained from hydrolysis of the acidified sphingan composition) with a solid base (e.g., a hydroxide form of an ion exchange resin).

Example 3. Preparation of Sphingan Oligosaccharide Using Resin Bead Column 3.1 Resin Beads Generated in Bucket A 500 mL batch of resin beads was generated with 3% $H_2SO_4$ in a bucket using the method mentioned above and from this, 463 mL of generated beads were loaded into the column as the initial step for the sphingan oligosaccharide preparation. The column was connected to an air pressurized bomb with a pressure regulator and constant air supply. The whole system was immersed in a constant flow hot water bath at 95° C. and the column was flushed with 95° C. DI water before running a 3% KELCOGEL® solution through.

To prepare the 3% KELCOGEL® solution, 45 g of KELCOGEL® powder was weighed and added into a blender with heating capabilities containing 1500 mL of DI water, not accounting for solids percent. The blender settings were 95° C. with agitation. Three blenders were running simultaneously to prepare a total volume of 4,500 mL of gellan solution.

Figure 3:
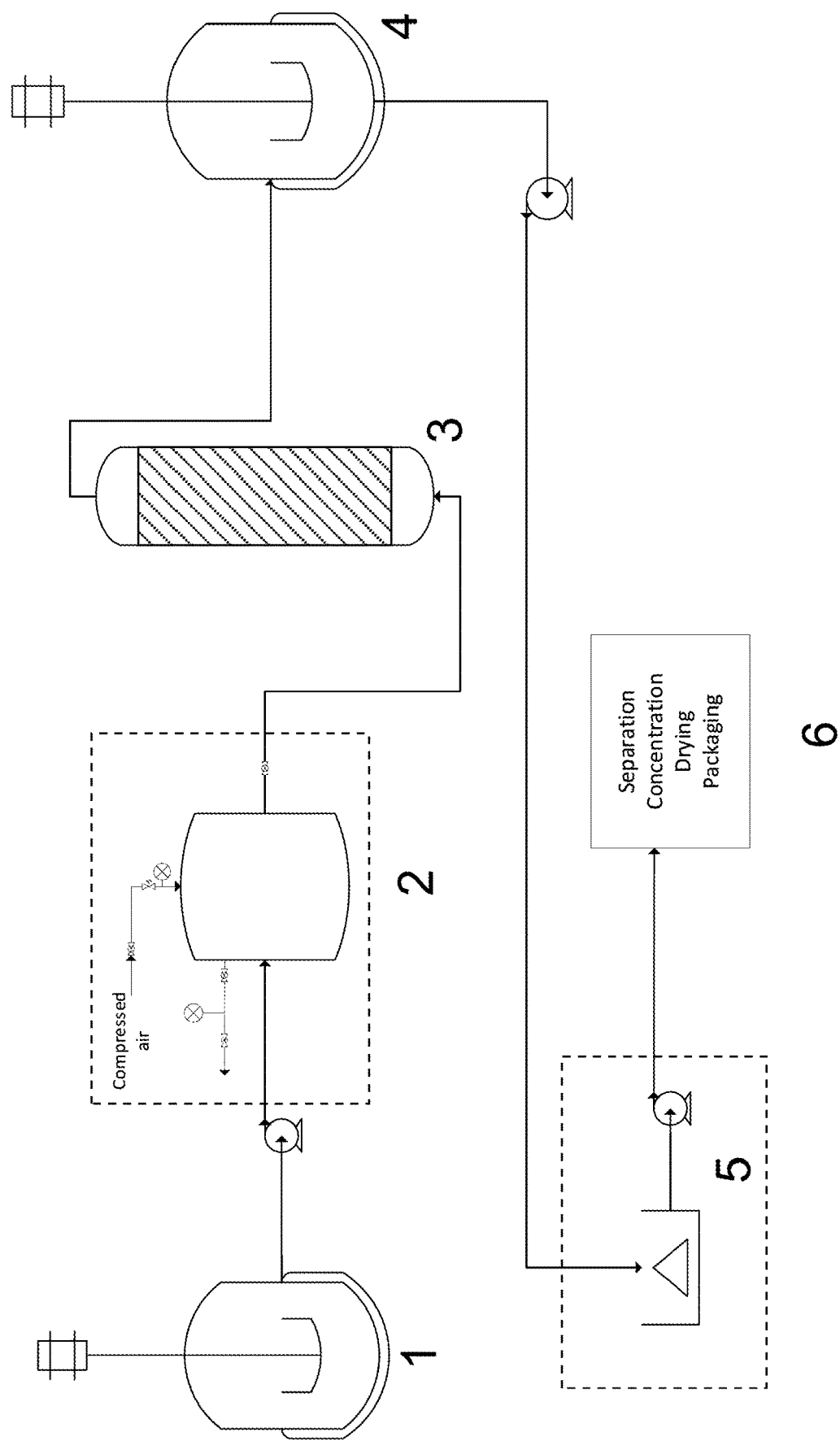
FIG. 3 represents a diagram of a reactor system contemplated herein.

FIG. 3 shows an exemplary diagram of a reactor system. In practice, a sphingan composition is provided in a reactor vessel 1, which may be transferred to a pressure bomb 2 or may be transferred directly to the column 3 for contacting the sphingan composition with an effective amount of a solid acid to obtain an exchanged solid acid and an acidified sphingan composition. The acidified sphingan composition may be transferred to a reactor vessel 4 for hydrolysis to obtain the sphingan oligosaccharide composition comprising a sphingan oligosaccharide. The sphingan oligosaccharide composition may be transferred to a centrifuge 5. Alternatively, the sphingan oligosaccharide composition may be subsequently processed 6. Aspects not shown in FIG. 3 include, for example, contacting the sphingan composition and/or the sphingan oligosaccharide composition with a solid base, pH adjustment, and filter system. A solid base may be contained in any suitable vessel, such as a column like 3.

Figure 4:
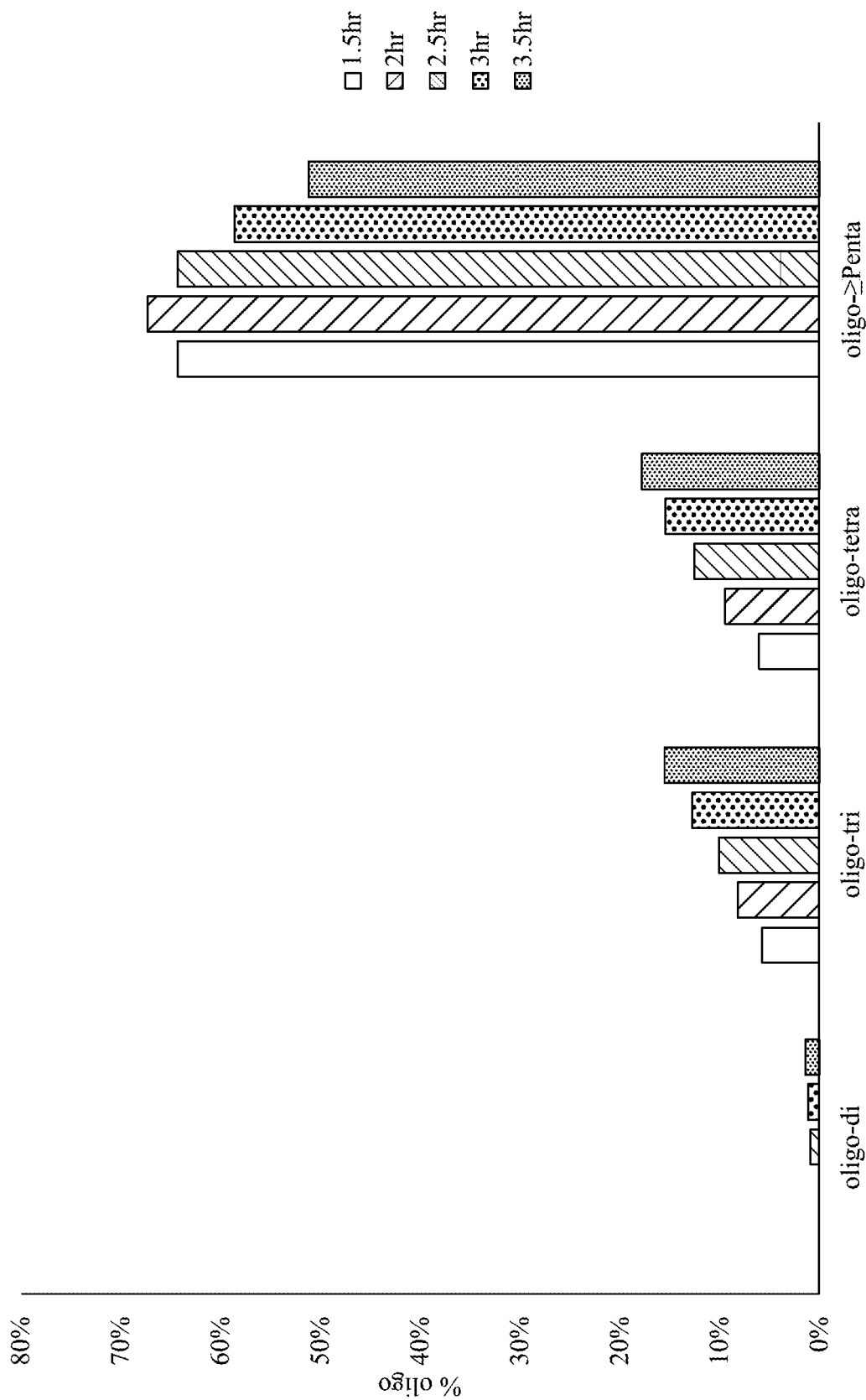
FIG. 4 represents a bar chart plot of sphingan oligosaccharides percentages, as measured from FIPA chromatogram, at different times (1.5-3.5 hr, from left to right) during reactions of a sphingan with a solid acid (Ex. 3.1).

The KELCOGEL® powder was fully soluble after 2 hours of mixing and this gellan solution was then immediately transferred to the pressure bomb (e.g., 2). The initial pH of the gellan solution was 5.4, passing through the column (e.g., 3) at 28-30 psi, with a specific flow rate of 21.83 gpm/ft³. The pH of post-column KELCOGEL® solution was 2.57. The solution initially passed through the column was then transferred back to the heated blender (e.g., 4) and held at 95° C. with agitation. A 250 mL sample was collected every half hour starting after the first 1.5 hour to monitor pH and reducing sugar. Five samples were collected and neutralized to pH 5.5-5.8 before taking the reducing sugar measurement. The pH values for five samples before neutralization were 1.91 (1.5 hr), 2.03 (2 hr), 2.03 (2.5 hr), 1.99 (3 hr) and 1.96 (3.5 hr). The amounts (% w/w) of reducing sugar was measured using the Fehling's test method and the values were 0.179 (1.5 hr), 0.236 (2 hr), 0.308 (2.5 hr), 0.418 (3 hr) and 0.464 (3.5 hr). The rest of solution from these five samples was freeze dried and analyzed by FIPA. FIPA data is shown in FIG. 4 and summarized in Table 2.

TABLE 2

Summary of percentage amounts of oligosaccharides for Ex. 3.1.

| Example- | Time (hr) | oligo-di | oligo-tri | oligo-tetra | oligo -≥ penta |
|---|---|---|---|---|---|
| 3.1 | 1.5 | N.D. | 6% | 6% | 64% |
|  | 2 | N.D. | 8% | 9% | 67% |
|  | 2.5 | 1% | 10% | 12% | 64% |
|  | 3 | 1% | 13% | 15% | 59% |
|  | 3.5 | 1% | 15% | 18% | 51% |

3.2 Resin Beads Generated in Column

Figure 5:
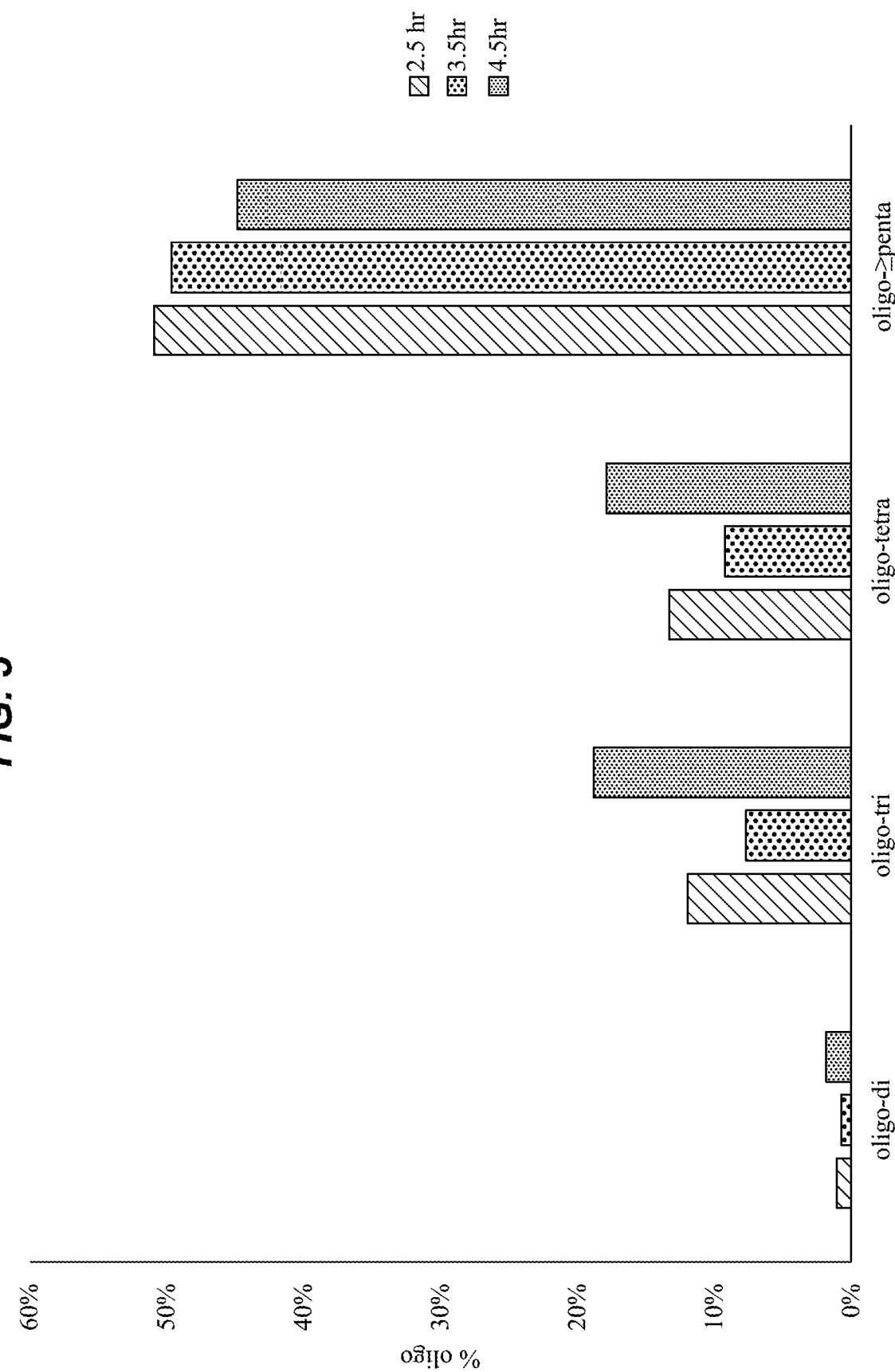
FIG. 5 represents a bar chart plot of sphingan oligosaccharides percentages, as measured from FIPA chromatogram, at different times (2.5-4.5 hr, from left to right) during reactions of a sphingan with a solid acid (Ex. 3.2).

A similar experiment, as described in Example 3.1, was performed using the resin beads generated in column itself. The column was packed with 463 mL of fresh resin beads and generated with 3% $H_2SO_4$ using the method mentioned in the Resin Generation/Regeneration in column. A 3,000 mL of 3% KELCOGEL® solution was prepared in a blender (e.g., a food liquid blender). The pH of the KELCOGEL® solution was 4.84, passing through the column at 28-30 psi, with a specific flow rate of 33.4 gpm/ft$^3$. The pH of the post-column KELCOGEL® solution was 1.29. Post-column solution was then transferred back to the blender and held for 4.5 hours at 95° C. with agitation. Four samples were taken and measured for pH and reducing sugar. The pH values for the four samples were 1.48 (2.5 hr), 1.40 (3.5 hr) and 1.34 (4.5 hr). The reducing sugar was measured after neutralization using the Fehling's test method and the values were 0.192 (2.5 hr), 0.392 (3.5 hr) and 0.572 (4.5 hr). FIPA data is shown in FIG. 5 and summarized in Table 3.

TABLE 3

Summary of percentage amounts of oligosaccharides for Ex. 3.2.

| Example | Time (hr) | oligo-di | oligo-tri | oligo-tetra | oligo -≥ penta |
|---|---|---|---|---|---|
| 3.2 | 2.5 | 1% | 12% | 13% | 51% |
|  | 3.5 | 1% | 8% | 9% | 50% |
|  | 4.5 | 2% | 19% | 18% | 45% |

Example 4. Preparation of Sphingan Oligosaccharide from Fermentation Broth

In this example, a sphingan oligosaccharide was prepared in a similar procedure as Example 3.2 but start from fermentation broth manufactured in a manner as previously described. Morrison 2016.

Figure 6:
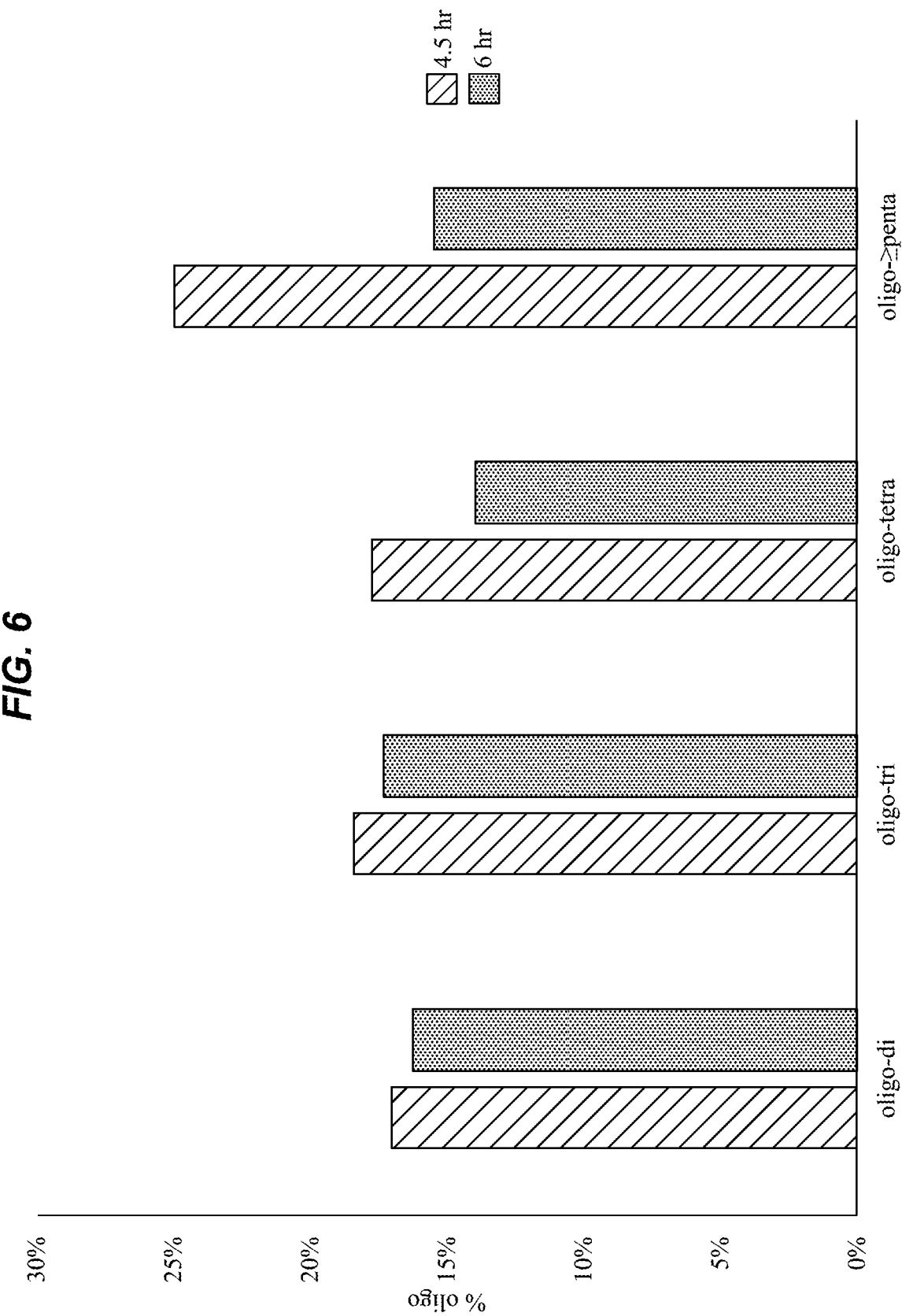
FIG. 6 represents a bar chart plot of sphingan oligosaccharides percentages, as measured from FIPA chromatogram, at different times (4.5 and 6 hr, from left to right) during reactions of a sphingan fermentation broth with a solid acid (Ex. 4).

A 3 L of KOH treated low acyl gellan fermentation broth was transferred into two blenders. The broth was mixed for 1 hour before transferring to the pressure bomb. The reducing sugar of the starting fermentation broth was 0.115. The pH of the old broth solution was 10.81, passing through the column at 28-30 psi, with a specific flow rate of 59.8 gpm/ft$^3$. The pH of posted-column broth solution was 1.45. Post-column solution was then transferred back to the blender and held for 6.0 hours at 95° C. with agitation. Two samples were taken and measured for pH and reducing sugar. The pH values for the two samples were 1.76 (4.5 hr) and 2.01 (6.0 hr). The reducing sugar was measured using Fehling's test method and the values were 0.367 (4.5 hr) and 0.367 (6.0 hr). FIPA data is shown in FIG. 6 and summarized in Table 4.

TABLE 4

Summary of percentage amounts of oligosaccharides for Ex. 4.

| Example | Time (hr) | oligo-di | oligo-tri | oligo-tetra | oligo -≥ penta |
|---|---|---|---|---|---|
| 4 | 4.5 | 17% | 18% | 18% | 25% |
|  | 6 | 16% | 17% | 14% | 15% |

Use of a solid acid in the preparation of a sphingan oligosaccharide may realize several process advantages including generation of a reduced amount of salt waste, improvement in downstream sphingan concentration steps and drying steps; and conservation of acid and reduction of overall acid use by containing the acid in the solid; especially, if the solid acid is regenerated.

As stated herein, the process may further comprise contacting the sphingan composition and/or the sphingan oligosaccharide composition with a solid base. The solid base may be a polymer-based solid base and may be characterized as, for example, the polymer-based solid base may be in the hydroxide form (viz., OH form). In certain instances, the commercially available polymer-based solid base may be present in the chloride (Cl-form). Accordingly, it may be of interest to convert the resin form to its corresponding hydroxide form (OH form). One may appreciate that resin generation/regeneration follows generally according to the resin-manufacturer technical data sheet in a column exerted to a continuous flow. This following information illustrates an exemplary process for converting the Cl– form to the OH form.

1. Add 600 L of cation exchanged water to a 1000 L tank.
2. Prepare a NaOH solution (about 4% (w/w)) by adding 100 kg of 28% (w/w) NaOH while mixing.
3. Add 200 L Purolite A300 resin to the tank.
4. Agitate for 1 h.
5. Separate with a vibrating sieve filter.
6. Fill 700 L of cation exchanged water in a 1000 L tank.
7. Readd the resin to the tank.
8. Agitate for 30 min.
9. Separate on a vibrating sieve filter.
10. Fill 700 L of cation exchanged water in a 1000 L tank.
11. Readd the resin to the tank.
12. Agitate for 30 min.
13. Separate on a vibrating sieve filter.
14. The resin is now in the OH form and ready to be used.

In an instance where the process further comprises contacting the sphingan composition and/or the sphingan oligosaccharide composition with a solid base, the following information illustrates an aspect of that additional process step, as exemplified by a gellan oligosaccharide ("GO") composition.

1. Provide for 750 L of 2% (w/w) GO composition.
2. Cool the GO composition to below 35° C.
3. Add 85 L of Purolite A300 resin to the solution.
4. Monitor that the pH does not exceed the target pH (e.g., a pH of not more than about 8). If pH increases above the target pH, adjust the pH using a suitable acid (e.g., HCl) or bubble gaseous $CO_2$ through the system.
5. Agitate for 30 minutes.
6. Separate the resin from the liquid on a vibrating sieve filter.

Aspects

Aspect 1. A process for preparing a sphingan oligosaccharide composition, comprising: (a) providing a sphingan composition comprising a sphingan and a liquid medium comprising a water; (b) contacting the sphingan composition with an effective amount of a solid acid to obtain an exchanged solid acid and an acidified sphingan composition; (c1) separating the acidified sphingan composition from the exchanged solid acid and hydrolyzing the acidified sphingan composition in the absence of the exchanged solid acid to obtain a sphingan hydrolysate composition; or (c2) hydrolyzing the acidified sphingan composition in the presence of the exchanged solid acid to obtain a sphingan hydrolysate composition and separating the exchanged solid acid from the sphingan hydrolysate composition; (d) adding a base to the sphingan hydrolysate composition to obtain the sphingan oligosaccharide composition having a pH of about 4 to about 8; and (e) optionally, contacting the sphingan composition and/or the sphingan oligosaccharide composition with a solid base.

Aspect 2. The process of Aspect 1, wherein the sphingan oligosaccharide composition is optionally subjected to one or more of the following steps: (f) contacting with a filter system; (g) concentrating; (h) centrifugation; (i) drying; and (j) packaging.

Aspect 3. The process of any one of the preceding Aspects, wherein the sphingan is present in an amount of from about 0.1% w/w to about 15% w/w based on the sphingan composition.

Aspect 4. The process of any one of the preceding Aspects, wherein the sphingan is a native sphingan; an unclarified sphingan; a low acyl, unclarified sphingan; a low acyl, clarified sphingan; or a combination thereof.

Aspect 5. The process of any one of the preceding Aspects, wherein the sphingan is gellan (S-60), welan (S-130), rhamsan (S-194), diutan (S-657), S-88, S-198, S-7; or a combination thereof.

Aspect 6. The process of any one of the preceding Aspects, wherein the sphingan is a low acyl, clarified gellan.

Aspect 7. The process of any one of the preceding Aspects, wherein the liquid medium comprises municipal water, deionized water, ion-exchanged water, distilled water, reverse-osmosis water, community supplied water, fermentation broth, or a combination thereof.

Aspect 8. The process of any one of the preceding Aspects, wherein the providing of step (a) comprises (i) dispersing a solid sphingan in the liquid medium or (ii) using a fermentation broth comprising a dispersed sphingan.

Aspect 9. The process of any one of the preceding Aspects, wherein the solid acid comprises a silica based solid acid, a zeolite based solid acid, a polymer based solid acid, a carbon based solid acid, a hydroxyapatite based solid acid, a zirconia based solid acid, or a combination thereof.

Aspect 10. The process of any one of the preceding Aspects, wherein the solid acid comprises a sulfonic acid-containing styrenic backbone having a total capacity of about 1 eq. L to about 2 eq./L.

Aspect 11. The process of any one of the preceding Aspects, wherein the acidified sphingan composition has a pH of (i) from about 0 to about 6, (ii) from about 1.5 to about 4.5, or (iii) from about 1.5 to about 4.

Aspect 12. The process of any one of the preceding Aspects, wherein the sphingan comprises a native sphingan, an unclarified sphingan, or a combination thereof and the hydrolyzing occurs at a temperature of from about 80° C. to about 140° C.

Aspect 13. The process of any one of the preceding Aspects, wherein the sphingan comprises a low acyl, unclarified sphingan; a low acyl, clarified sphingan; or a combination thereof and the hydrolyzing occurs at a temperature of from about 35° C. to about 110° C.

Aspect 14. The process of any one of the preceding Aspects, wherein the sphingan oligosaccharide composition has a residual salt content of: (i) not more than about 5% by weight based on the weight of the sphingan oligosaccharide, (ii) not more than about 1% by weight based on the weight of the sphingan oligosaccharide, or (iii) not more than about 0.5% by weight based on the weight of the sphingan oligosaccharide.

Aspect 15. The process of any one of the preceding Aspects, comprising contacting the sphingan composition and/or the sphingan oligosaccharide composition with a solid base, wherein the sphingan oligosaccharide composition has a residual salt content of from about 0.001% to about 0.5% by weight of the composition.

Aspect 16. A composition comprising the sphingan oligosaccharide composition prepared by the process of any one of the preceding Aspects.

Aspect 17. A composition comprising: a sphingan oligosaccharide composition having a residual salt content of not more than about 5% by weight of the composition.

Aspect 18. The composition of Aspect 17, wherein the sphingan oligosaccharide composition has a residual salt content of not more than about 0.5% by weight of the composition.

Aspect 19. The composition of Aspect 17, wherein the sphingan oligosaccharide composition has a residual salt content of from about 0.001% to about 0.5% by weight of the composition.

Aspect 20. An ingestible composition comprising: a prebiotic effective amount of the composition of any one of Aspects 16-19 and at least one ingestible ingredient.

CITATION LISTING

Bielecka et al., *Selection of probiotics and probiotics for synbiotics and confirmation of their in vivo effectiveness*, Food Research International (2002) 35(2-3): 125-131 ("Bielecka 2002").

See online collection of ion exchange resins collected by Francois de Dardel, dardel.info/IX/AllResins.php?sort=4&filtre=2, last accessed on Jun. 22, 2021 ("Dardel").

Gupta et al., *Solid Acids: Green alternatives for acid catalysis*, Catalysis Today (2014) 236(Part B): 153-170 ("Gupta 2014").

Liu et al., *Hydrophobic Solid Acids and Their Catalytic Applications in Green and Sustainable Chemistry*, ACS Catal. (2018) 8(1): 372-391 ("Liu 2018").

U.S. Patent Application Publication US 2016/0295887 A1, Gellan Gum Products and Methods of Manufacture and Use Thereof published on Oct. 13, 2016, to Morrison et al. of CP Kelco U.S., Inc. ("Morrison 2016").

U.S. Patent Application Publication US 2020/0230167 A1, Prebiotic Composition and its Use, published on Jul. 23, 2020 to Morrison et al. of CP Kelco U.S., Inc. ("Morrison 2020"); expressly incorporated by reference in its entirety.

U.S. Pat. No. 3,275,687 A, Ester Hydrolysis with Cation Exchange Resins, issued on Sep. 27, 1966 to Leib et al. of Monsanto Company ("Leib 1966").

U.S. Pat. No. 6,242,035 B1, Reduced Molecular Weight Native Gellan Gum, issued on Jun. 5, 2001 to Clark et al. of CP Kelco, U.S., Inc. ("Clark 2001").

U.S. Pat. No. 8,231,921 B2, High Performance Gellan Gums and Methods for Production Thereof, issued on Jul. 31, 2012 to Bezanson et al. of CP Kelco U.S., Inc. ("Bezanson 2012").

U.S. Pat. No. 9,284,615 B2, Acid Hydrolysis of Lignocellulosic Biomass with Minimal use of an Acid Catalysts, issued on Mar. 15, 2016 to Torres et al. of Biochemtex S.p.A. ("Torres 2016").

Okuhara, T., *Water-Tolerant Solid Acid Catalysts*, Chem. Rev. 2002, 102(10): 3641-3666 ("Okuhara 2002").

Steer et al., *Perspectives on the role of the human gut microbiota and its modulation by pro-and prebiotics*, Nutrit. Res. Revs. (2000) 13(2): 229-254 ("Steer 2000").

Suganuma et al., *Hydrolysis of Cellulose by Amorphous Carbon Bearing SO3H, COOH, and OH Groups*, J. Am. Chem. Soc. 2008, 130(38): 12787-12793 ("Suganuma 2008").

Vogel's Textbook of Practical Organic Chemistry (1989), Section 2.19 Filtration Techniques, pages 133-135 ("Vogel's").

Zoetendal et al., *Temperature Gradient Gel Electrophoresis Analysis of 16S rRNA from Human Fecal Samples Reveals Stable and Host-Specific Communities of Active Bacteria*, App. Environ. Microbiol. (1998) 64(10): 3854-3859 ("Zoetendal 1998").

Lewatit® S 1568 Product Information, 2020.

Purolite® A300 Product Data Sheet, 2020.

Alternative embodiments, examples, and modifications which would still be encompassed by the disclosure may be made by those skilled in the art, particularly considering the foregoing teachings. Further, the terminology used to describe the disclosure is intended to be words of description rather than of limitation.

The subject matter of U.S. patent application Ser. No. 16/743,806 is hereby incorporated by reference in its entirety. Further the subject matter of U.S. Provisional Application No. 63/053,193, filed on Jul. 17, 2020 is incorporated by reference in its entirety. Additionally, references described herein are incorporated by reference in their entirety to the extent necessary. If there is a difference in meaning between the incorporated terms and the terms disclosed herein, the meaning of the terms disclosed herein will control.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

The invention claimed is:

1. A process for preparing a sphingan oligosaccharide composition, comprising:
   (a) providing a sphingan composition comprising a sphingan and a liquid medium comprising a water;
   (b) contacting the sphingan composition with an effective amount of a solid acid to obtain an exchanged solid acid and an acidified sphingan composition;
   (c1) separating the acidified sphingan composition from the exchanged solid acid and hydrolyzing the acidified sphingan composition in the absence of the exchanged solid acid to obtain a sphingan hydrolysate composition; or
   (c2) hydrolyzing the acidified sphingan composition in the presence of the exchanged solid acid to obtain a sphingan hydrolysate composition and separating the exchanged solid acid from the sphingan hydrolysate composition;
   (d) adding a base to the sphingan hydrolysate composition to obtain the sphingan oligosaccharide composition having a pH of about 4 to about 8; and
   (e) optionally, contacting the sphingan composition and/or the sphingan oligosaccharide composition with a solid base;
   wherein the hydrolyzing occurs at a temperature of from about 35° C. to about 140° C.

2. The process of claim 1, wherein the sphingan oligosaccharide composition is optionally subjected to one or more of the following steps: (f) contacting with a filter system; (g) concentrating; (h) centrifugation; (i) drying; and (j) packaging.

3. The process of claim 1, wherein the sphingan is present in an amount of from about 0.1% w/w to about 15% w/w based on the sphingan composition.

4. The process of claim 1, wherein the sphingan is a native sphingan; an unclarified sphingan; a low acyl, unclarified sphingan; a low acyl, clarified sphingan; or a combination thereof.

5. The process of claim 1, wherein the sphingan is gellan (S-60), welan (S-130), rhamsan (S-194), diutan (S-657), S-88, S-198, S-7; or a combination thereof.

6. The process of claim 1, wherein the sphingan is a low acyl, clarified gellan.

7. The process of claim 1, wherein the liquid medium comprises municipal water, deionized water, ion-exchanged water, distilled water, reverse-osmosis water, community supplied water, fermentation broth, or a combination thereof.

8. The process of claim 1, wherein the providing of step (a) comprises (i) dispersing a solid sphingan in the liquid medium or (ii) using a fermentation broth comprising a dispersed sphingan.

9. The process of claim 1, wherein the solid acid comprises a silica based solid acid, a zeolite based solid acid, a polymer based solid acid, a carbon based solid acid, a hydroxyapatite based solid acid, a zirconia based solid acid, or a combination thereof.

10. The process of claim 1, wherein the solid acid comprises a sulfonic acid-containing styrenic backbone having a total capacity of about 1 eq. L to about 2 eq./L.

11. The process of claim 1, wherein the acidified sphingan composition has a pH of (i) from about 0 to about 6, (ii) from about 1.5 to about 4.5, or (iii) from about 1.5 to about 4.

12. The process of claim 1, wherein the sphingan comprises a native sphingan, an unclarified sphingan, or a combination thereof and the hydrolyzing occurs at a temperature of from about 80° C. to about 140° C.

13. The process of claim 1, wherein the sphingan comprises a low acyl, unclarified sphingan; a low acyl, clarified sphingan; or a combination thereof and the hydrolyzing occurs at a temperature of from about 35° C. to about 110° C.

14. The process of claim 1, wherein the sphingan oligosaccharide composition has a residual salt content of: (i) of not more than about 5% by weight based on the weight of the sphingan oligosaccharide, (ii) of not more than about 1% by weight based on the weight of the sphingan oligosaccharide, or (iii) of not more than about 0.5% by weight based on the weight of the sphingan oligosaccharide.

15. The process of claim 1 comprising contacting the sphingan composition and/or the sphingan oligosaccharide composition with a solid base, wherein the sphingan oligosaccharide composition has a residual salt content of from about 0.001% to about 0.5% by weight of the composition.

16. The process of claim 1, wherein the acidified sphingan composition has a pH of from about 0 to about 6.

17. The process of claim 1, wherein the acidified sphingan composition has a pH of from about 1.5 to about 4.5.

18. The process of claim 1, wherein the acidified sphingan composition has a pH of from about 1.5 to about 4.

19. The process of claim 1, wherein the hydrolyzing occurs at a temperature of from about 90° C. to about 130° C.

20. The process of claim 1, wherein the hydrolyzing occurs for about 1.5 hours to about 6 hours.

* * * * *